(12) United States Patent
Basol et al.

(10) Patent No.: US 7,648,622 B2
(45) Date of Patent: Jan. 19, 2010

(54) SYSTEM AND METHOD FOR ELECTROCHEMICAL MECHANICAL POLISHING

(75) Inventors: Bulent M. Basol, Manhattan Beach, CA (US); Homayoun Talieh, San Jose, CA (US)

(73) Assignee: Novellus Systems, Inc., San Jose, CA (US)

( * ) Notice: Subject to any disclaimer, the term of this patent is extended or adjusted under 35 U.S.C. 154(b) by 931 days.

(21) Appl. No.: 11/173,233

(22) Filed: Jul. 1, 2005

(65) Prior Publication Data

US 2006/0006073 A1  Jan. 12, 2006

Related U.S. Application Data

(63) Continuation-in-part of application No. 11/069,202, filed on Feb. 28, 2005, now abandoned.

(60) Provisional application No. 60/585,200, filed on Jul. 1, 2004, provisional application No. 60/548,239, filed on Feb. 27, 2004.

(51) Int. Cl.
*C25F 3/22* (2006.01)
*B23H 5/06* (2006.01)

(52) U.S. Cl. ...................... 205/663; 205/641

(58) Field of Classification Search ............ None
See application file for complete search history.

(56) References Cited

U.S. PATENT DOCUMENTS

| | | | |
|---|---|---|---|
| 669,923 A | 3/1901 | Grauert | |
| 2,540,602 A | 2/1951 | Thomas et al. | |
| 2,708,181 A | 5/1955 | Holmes et al. | |
| 2,965,556 A | 12/1960 | Laurits | |
| 3,328,273 A | 6/1967 | Creutz et al. | |
| 3,448,023 A | 6/1969 | Bell | |
| 3,559,346 A | 2/1971 | Paola | |
| 3,637,468 A | 1/1972 | Icxi et al. | |
| 3,779,887 A | 12/1973 | Gildone | |
| 3,888,050 A | 6/1975 | Elm | |
| 3,959,089 A | 5/1976 | Watts | |
| 3,990,959 A | 11/1976 | Payne et al. | |

(Continued)

FOREIGN PATENT DOCUMENTS

DE  2008664  9/1971

(Continued)

OTHER PUBLICATIONS

Contolini et al., "Electrochemical planarization for multilevel metallization," Sep. 1994, pp. 2503-2510.

(Continued)

*Primary Examiner*—Harry D Wilkins, III
(74) *Attorney, Agent, or Firm*—Knobbe Martens Olson & Bear, LLP

(57) ABSTRACT

A method and apparatus for electropolishing a conductive surface of a semiconductor wafer. The apparatus includes a polisher having at least one first electrode and at least one second electrode separated from one another by an isolation region. A moving mechanism rotates the wafer while the conductive surface of the wafer is moved linearly and parallel to a first direction, which varies an exposure of the relative surface areas of the conductive surface to the at least one first electrode and the at least one second electrode.

19 Claims, 13 Drawing Sheets

U.S. PATENT DOCUMENTS

| | | |
|---|---|---|
| 4,339,319 A | 7/1982 | Aigo |
| 4,391,684 A | 7/1983 | Goddard |
| 4,412,400 A | 11/1983 | Hammond |
| 4,430,173 A | 2/1984 | Boudot et al. |
| 4,431,501 A | 2/1984 | Leppanen |
| 4,610,772 A | 9/1986 | Palnik |
| 4,713,149 A | 12/1987 | Hoshino |
| 4,772,361 A | 9/1988 | Dorsett et al. |
| 4,802,309 A | 2/1989 | Heynacher |
| 4,944,119 A | 7/1990 | Gill et al. |
| 4,948,474 A | 8/1990 | Miljkovic |
| 4,954,142 A | 9/1990 | Carr et al. |
| 4,975,159 A | 12/1990 | Dahms |
| 5,024,735 A | 6/1991 | Kadija |
| 5,084,071 A | 1/1992 | Nenadic et al. |
| 5,095,661 A | 3/1992 | Gill et al. |
| 5,162,047 A | 11/1992 | Wada et al. |
| 5,171,412 A | 12/1992 | Talieh et al. |
| 5,245,796 A | 9/1993 | Miller et al. |
| 5,256,565 A | 10/1993 | Bernhardt et al. |
| 5,329,732 A | 7/1994 | Karlsrud et al. |
| 5,335,453 A | 8/1994 | Baldy et al. |
| 5,354,490 A | 10/1994 | Yu et al. |
| 5,377,452 A | 1/1995 | Yamaguchi |
| 5,377,453 A | 1/1995 | Perneczky |
| 5,429,733 A | 7/1995 | Ishida |
| 5,472,592 A | 12/1995 | Lowery |
| 5,473,433 A | 12/1995 | Miller |
| 5,476,414 A | 12/1995 | Hirose et al. |
| 5,489,235 A | 2/1996 | Gagliardi et al. |
| 5,498,199 A | 3/1996 | Karlsrud et al. |
| 5,516,412 A | 5/1996 | Andricacos et al. |
| 5,518,542 A | 5/1996 | Matsukawa et al. |
| 5,558,568 A | 9/1996 | Talieh et al. |
| 5,565,034 A | 10/1996 | Nanbu et al. |
| 5,593,344 A | 1/1997 | Weldon et al. |
| 5,650,039 A | 7/1997 | Talieh |
| 5,679,212 A | 10/1997 | Kato et al. |
| 5,681,215 A | 10/1997 | Sherwood et al. |
| 5,686,143 A | 11/1997 | Matsukawa et al. |
| 5,692,947 A | 12/1997 | Talieh et al. |
| 5,700,366 A | 12/1997 | Steblianko et al. |
| 5,707,409 A | 1/1998 | Martin et al. |
| 5,755,859 A | 5/1998 | Brusic et al. |
| 5,759,918 A | 6/1998 | Hoshizaki et al. |
| 5,762,544 A | 6/1998 | Zuniga et al. |
| 5,762,751 A | 6/1998 | Bleck et al. |
| 5,770,095 A | 6/1998 | Sasaki et al. |
| 5,770,521 A | 6/1998 | Pollock |
| 5,773,364 A | 6/1998 | Farkas et al. |
| 5,793,272 A | 8/1998 | Burghartz et al. |
| 5,795,215 A | 8/1998 | Guthrie et al. |
| 5,807,165 A | 9/1998 | Uzoh et al. |
| 5,810,964 A | 9/1998 | Shiraishi |
| 5,833,820 A | 11/1998 | Dubin |
| 5,840,629 A | 11/1998 | Carpio |
| 5,851,136 A | 12/1998 | Lee |
| 5,858,813 A | 1/1999 | Scherber et al. |
| 5,863,412 A | 1/1999 | Ichinose et al. |
| 5,882,498 A | 3/1999 | Dubin et al. |
| 5,884,990 A | 3/1999 | Burghartz et al. |
| 5,893,755 A | 4/1999 | Nakayoshi |
| 5,897,375 A | 4/1999 | Watts et al. |
| 5,899,798 A | 5/1999 | Trojan et al. |
| 5,899,801 A | 5/1999 | Tolles et al. |
| 5,908,530 A | 6/1999 | Hoshizaki et al. |
| 5,911,619 A | 6/1999 | Uzoh et al. |
| 5,913,716 A | 6/1999 | Mucci et al. |
| 5,922,091 A | 7/1999 | Tsai et al. |
| 5,930,669 A | 7/1999 | Uzoh |
| 5,933,753 A | 8/1999 | Simon et al. |
| 5,951,377 A | 9/1999 | Vaughn et al. |
| 5,954,997 A | 9/1999 | Kaufman et al. |
| 5,961,372 A | 10/1999 | Shendon |
| 5,968,333 A | 10/1999 | Nogami et al. |
| 5,975,988 A | 11/1999 | Christianson |
| 5,976,331 A | 11/1999 | Chang et al. |
| 5,985,123 A | 11/1999 | Koon |
| 5,993,302 A | 11/1999 | Chen et al. |
| 6,001,235 A | 12/1999 | Arken et al. |
| 6,004,880 A | 12/1999 | Liu et al. |
| 6,009,890 A | 1/2000 | Kaneko et al. |
| 6,017,831 A | 1/2000 | Beardsley et al. |
| 6,024,630 A | 2/2000 | Shendon et al. |
| 6,027,631 A | 2/2000 | Broadbent |
| 6,045,716 A | 4/2000 | Walsh et al. |
| 6,062,959 A * | 5/2000 | Weldon et al. ............... 451/307 |
| 6,063,506 A | 5/2000 | Andricacos et al. |
| 6,066,030 A | 5/2000 | Uzoh |
| 6,068,542 A | 5/2000 | Hosokai |
| 6,071,388 A | 6/2000 | Uzoh |
| 6,074,544 A | 6/2000 | Reid et al. |
| 6,086,454 A | 7/2000 | Watanabe et al. |
| 6,103,085 A | 8/2000 | Woo et al. |
| 6,103,628 A | 8/2000 | Talieh |
| 6,110,025 A | 8/2000 | Williams et al. |
| 6,113,479 A | 9/2000 | Sinclair et al. |
| 6,129,540 A | 10/2000 | Hoopman et al. |
| 6,132,587 A | 10/2000 | Jorne et al. |
| 6,135,859 A | 10/2000 | Tietz |
| 6,136,163 A | 10/2000 | Cheung et al. |
| 6,136,715 A | 10/2000 | Shendon |
| 6,143,155 A | 11/2000 | Adams et al. |
| 6,156,167 A | 12/2000 | Patton et al. |
| 6,159,354 A | 12/2000 | Contolini et al. |
| 6,162,344 A | 12/2000 | Reid et al. |
| 6,176,992 B1 | 1/2001 | Talieh |
| 6,179,690 B1 | 1/2001 | Talieh |
| 6,179,709 B1 | 1/2001 | Redeker et al. |
| 6,180,020 B1 | 1/2001 | Moriyama et al. |
| 6,187,152 B1 | 2/2001 | Ting et al. |
| 6,207,572 B1 | 3/2001 | Talieh |
| 6,210,554 B1 | 4/2001 | Kosaki et al. |
| 6,228,231 B1 | 5/2001 | Uzoh |
| 6,241,583 B1 | 6/2001 | White |
| 6,251,236 B1 | 6/2001 | Stevens |
| 6,261,426 B1 | 7/2001 | Uzoh et al. |
| 6,267,642 B1 | 7/2001 | Vogtmann et al. |
| 6,270,646 B1 | 8/2001 | Walton et al. |
| 6,302,767 B1 | 10/2001 | Tietz |
| 6,312,319 B1 | 11/2001 | Donohue et al. |
| 6,334,937 B1 | 1/2002 | Batz et al. |
| 6,354,926 B1 | 3/2002 | Walsh |
| 6,379,231 B1 | 4/2002 | Birang et al. |
| 6,405,740 B1 | 6/2002 | Vogtmann et al. |
| 6,413,403 B1 * | 7/2002 | Lindquist et al. ............... 205/97 |
| 6,413,873 B1 | 7/2002 | Li et al. |
| 6,419,559 B1 | 7/2002 | Gurusamy et al. |
| 6,428,394 B1 | 8/2002 | Mooring et al. |
| 6,439,978 B1 | 8/2002 | Jones et al. |
| 6,443,824 B2 | 9/2002 | Shendon et al. |
| 6,468,139 B1 | 10/2002 | Talieh et al. |
| 6,471,847 B2 * | 10/2002 | Talieh et al. ................. 205/147 |
| 6,475,070 B1 | 11/2002 | White |
| 6,482,307 B2 | 11/2002 | Ashjaee et al. |
| 6,500,056 B1 | 12/2002 | Krusell et al. |
| 6,537,144 B1 | 3/2003 | Tsai et al. |
| 6,572,755 B2 * | 6/2003 | Emesh et al. ................ 205/137 |
| 6,610,190 B2 * | 8/2003 | Basol et al. .................. 205/133 |
| 6,776,693 B2 * | 8/2004 | Duboust et al. ............... 451/41 |
| 6,802,955 B2 * | 10/2004 | Emesh et al. ................ 205/662 |
| 6,852,208 B2 * | 2/2005 | Ashjaee et al. ............... 205/137 |
| 6,893,328 B2 * | 5/2005 | So ............................... 451/41 |
| 7,029,567 B2 * | 4/2006 | Basol ........................... 205/223 |

| | | | |
|---|---|---|---|
| 7,153,400 B2* | 12/2006 | Ravkin et al. ............ 204/224 R | |
| 2002/0053516 A1* | 5/2002 | Basol et al. ................. 205/118 | |
| 2002/0111121 A1 | 8/2002 | Sun et al. | |
| 2002/0123298 A1 | 9/2002 | Krusell et al. | |
| 2002/0134748 A1* | 9/2002 | Basol et al. .................... 216/13 | |
| 2003/0029731 A1* | 2/2003 | Ashjaee et al. .............. 205/137 | |
| 2003/0116444 A1* | 6/2003 | Basol ......................... 205/668 | |
| 2003/0141201 A1* | 7/2003 | Basol ......................... 205/668 | |
| 2003/0213703 A1* | 11/2003 | Wang et al. ................. 205/662 | |
| 2003/0230491 A1* | 12/2003 | Basol et al. ................... 205/82 | |
| 2004/0214510 A1* | 10/2004 | So .............................. 451/41 | |
| 2005/0016868 A1* | 1/2005 | Basol et al. ................. 205/654 | |
| 2005/0133379 A1* | 6/2005 | Basol et al. ................. 205/652 | |
| 2005/0159084 A1* | 7/2005 | Basol et al. ................... 451/41 | |
| 2006/0006073 A1* | 1/2006 | Basol et al. ................. 205/640 | |

FOREIGN PATENT DOCUMENTS

| | | |
|---|---|---|
| DE | 31 13 204 A | 10/1982 |
| DE | 4324330 | 3/1994 |
| EP | 0 517 594 A | 12/1992 |
| EP | 1 037 263 A2 | 9/2000 |
| WO | WO 97/20660 A | 6/1997 |
| WO | WO 98/27585 | 6/1998 |
| WO | WO 99/22908 | 5/1999 |
| WO | WO 00/26443 | 5/2000 |
| WO | WO 02/02272 | 1/2002 |
| WO | WO 02/29859 | 4/2002 |
| WO | WO 02/057514 | 7/2002 |
| WO | WO 03/028048 A2 | 4/2003 |

OTHER PUBLICATIONS

Kelly et al., "Leveling and microstructural effect of additives for copper electrodeposition," *Journal of the Electrochemical Society*, 1999, pp. 2540-2545, vol. 146, No. 7.

Madore et al., Blocking inhibitors in Catholic leveling, *I. Theoretical Analysis*, Dec. 1996, pp. 3927-3942.

Mikkola et al., "Investigation of the roles of the additive components for second generation copper electroplating chemistries used for advanced interconnect metallization," *2000 IEEE*, Jun. 2000, pp. 117-119, IEEE Electron Devices Society.

Rubinstein, "Tampongalvanisieren in der Praxis, Teil 1," *Galvanotechnik*, 1988, pp. 3263-3270, vol. 79, No. 10.

Steigerwald et al., "Chemical mechanical planarization of microelectronic materials," 1997, pp. 212-222, A Wiley-Interscience Publication, by John Wiley & Sons, Inc.

Steigerwald et al., "Pattern geometry effects in the chemical-mechanical polishing of inlaid copper structures," Oct. 1994, pp. 2842-2848.

West et al., "Pulse reverse copper electrodeposition in high aspect ratio trenches and vias," Sep. 1998, pp. 3070-3073.

* cited by examiner

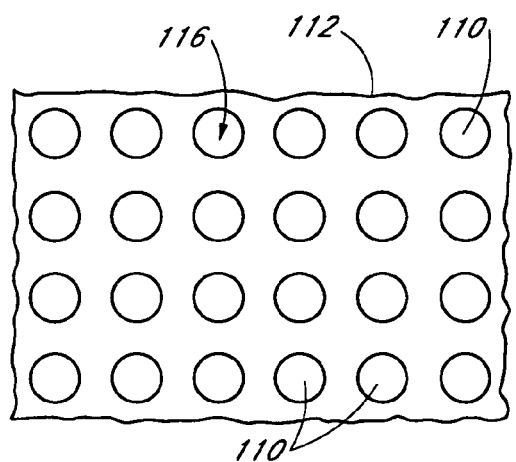
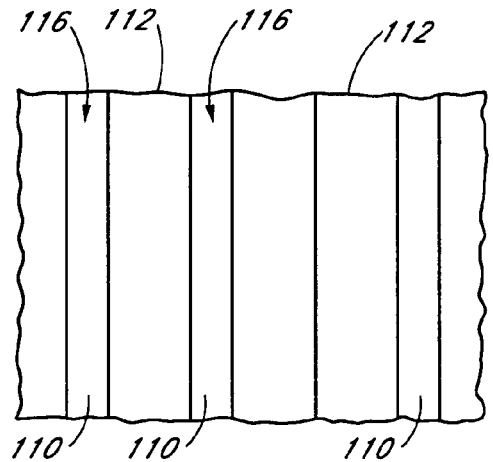
*FIG. 3A*  *FIG. 3B*
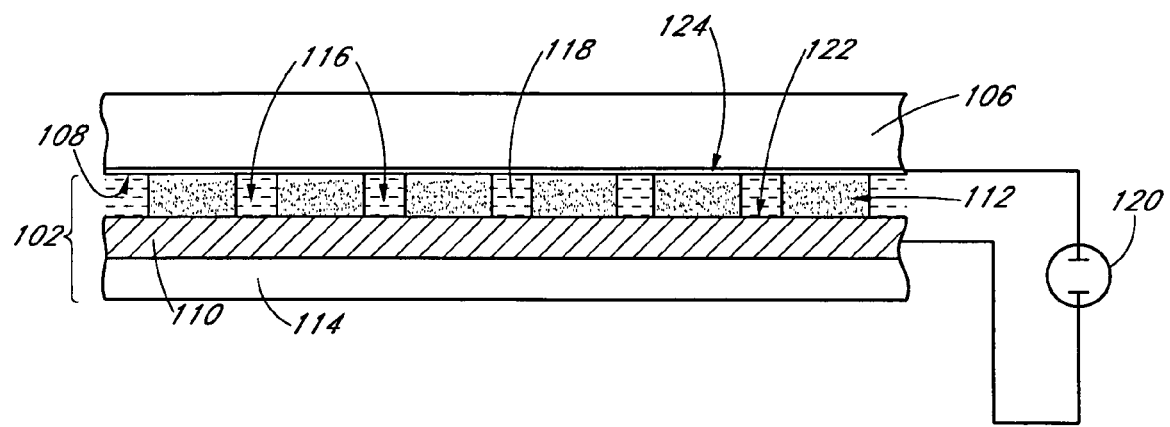
*FIG. 4*

SYSTEM AND METHOD FOR ELECTROCHEMICAL MECHANICAL POLISHING

RELATED APPLICATIONS

This application claims priority to U.S. Provisional Application No. 60/585,200, filed on Jul. 1, 2004; U.S. Provisional Application No. 60/548,239, filed on Feb. 27, 2004 (NT-318 P); and U.S. patent application Ser. No. 11/069,202, filed on Feb. 28, 2005 (NT-318 U), now abandoned, of which this application is a continuation-in-part. This application is also related to U.S. patent application Ser. No. 10/302,213, filed Nov. 22, 2002 (NT-105 C1), now abandoned, which is a continuation of U.S. patent application Ser. No. 09/685,934, filed Oct. 11, 2000 (NT-105), now U.S. Pat. No. 6,497,800. This application is also related to U.S. patent application Ser. No. 10/460,032, filed Jun. 11, 2003 (NT-200 C1), now U.S. Pat. No. 6,942,780, which is a continuation of U.S. patent application Ser. No. 09/760,757, filed Jan. 17, 2001 (NT-200), now U.S. Pat. No. 6,610,190. This application is also related to U.S. patent application Ser. No. 10/283,025, filed Oct. 28, 2002 (NT-215-3), now U.S. Pat. No. 7,211,174, U.S. patent application. Ser. No. 10/391,924, filed Mar. 18, 2003 (NT-291), now U.S. Pat. No. 7,578,923, U.S. patent application Ser. No. 10/288,558, filed on Nov. 4, 2002 (NT-234), now U.S. Pat. No. 7,097,755. The contents of all of the foregoing patents and application are hereby incorporated herein by reference in their entireties.

FIELD

The present invention generally relates to semiconductor integrated circuit technology and, more particularly, to an electropolishing or electroetching process and apparatus.

BACKGROUND

Conventional semiconductor devices generally include a semiconductor substrate, usually a silicon substrate, and a plurality of sequentially formed dielectric layers and conductive paths or interconnects made of conductive materials. Interconnects are usually formed by filling a conductive material in features or cavities etched into the dielectric layers. In an integrated circuit, multiple levels of interconnect networks laterally extend with respect to the substrate surface. Interconnects formed in different layers can be electrically connected using vias or contacts.

The filling of a conductive material into features, such as vias or trenches to form pads, lines, or contacts, can be carried out by electrodeposition. In an electrodeposition or electroplating method, a conductive material, such as copper, is deposited over the substrate surface, including into such features. Then, a material removal technique is typically employed to planarize and remove the excess metal from the top surface, leaving conductors only in the features. The standard material removal technique that is most commonly used for this purpose is chemical mechanical polishing (CMP). Chemical etching, electropolishing (which is also referred to as electroetching or electrochemical etching), and electrochemical mechanical polishing are also attractive process options for copper removal. Copper is the material of choice, at this time, for interconnect applications because of its low resistivity and good electromigration properties.

Standard electroplating techniques yield copper layers that deposit conformally over large features, such as features with widths larger than a few micrometers. This results in a plated wafer surface topography that is not flat. FIG. 1 shows an exemplary structure after a copper plating step. The substrate 10 includes small features 12, such as high aspect ratio trenches or vias, and large trenches 14. The features 12, 14 are formed, e.g., etched into a dielectric layer 16. The substrate 10 is an exemplary portion of a partially fabricated semiconductor wafer. The dielectric layer 16 has a top surface 18. The features 12, 14 and the surface 18 of the dielectric are coated with a barrier and/or adhesion layer 20 and a copper seed layer 22. The barrier layer 20 may be formed of Ta, TaN or combinations of any other materials that are commonly used as barriers to copper migration. The seed layer 22 is deposited over the barrier layer 20, although for specially designed barrier layers there may not be a need for a seed layer. After depositing the seed layer 22, copper is electrodeposited thereon from a suitable plating bath to form the copper layer 24.

During removal of the excess conductor, employing for example a CMP, etching or electropolishing process, the non-flat surface topography of the copper layer 24 is planarized as the excess conductor is removed from the surface, leaving it only within the features and desirably having a flat surface. As described above, standard electroplating techniques yield conformal deposits over large features and non-planar workpiece surfaces that need to be planarized during the excess material removal step. CMP has a tendency, however, to cause "dishing" of the copper surface within larger features 14.

Newly developed electrodeposition techniques, which are collectively called Electrochemical Mechanical Deposition (ECMD) methods, utilize a WSID (workpiece surface influencing device), such as a pad, a polishing pad, a mask or a sweeper in close proximity of the wafer surface during conductor deposition. Action of the WSID during plating gives planar conductor deposits with a flat surface topography even over the largest features present on the workpiece surface. Such a planar deposit is shown as layer 26 in FIG. 1. Removal of excess conductive material, such as copper from such planar deposits, does not require further planarization during the material removal step. Therefore, CMP, electropolishing or electroetching, chemical etching, and electrochemical mechanical polishing techniques may all be successfully employed for removing the overburden in a planar and uniform manner in this case.

Although much progress has been made in electropolishing approaches and apparatuses, there is still a need for electrochemical removal techniques that uniformly planarize and remove excess conductive films from workpiece surfaces. Preferably, such techniques should apply low force on the surface and without causing damage and defects, especially on advanced wafers with low-k materials.

SUMMARY

According to an aspect of the invention, a method is provided for electropolishing a conductive surface on a wafer. The conductive surface is positioned in proximity to a polisher having at least one cathode surface and at least one anode surface. The wafer is rotated and the conductive surface is moved linearly parallel to a first direction and over both the at least one anode surface and the at least one cathode surface so as to vary an exposure of relative surface areas of the conductive surface to the at least one cathode surface and the at least one anode surface. The conductive surface is electropolished.

According to another aspect, a method is provided for electrochemical removal of conductive material from a conductive surface of a wafer. The conductive surface is positioned on a polisher having a first electrode and a second electrode, wherein the first electrode extends along a first side of the polisher and the second electrode extends along a second side of the polisher. An edge surface region of the conductive surface is contacted at the first side of the polisher to provide electrical connection. The wafer is rotated and the conductive surface is linearly moved parallel to a first direction and over both the first electrode and the second electrode so as to vary an exposure of relative surface areas of the conductive surface to the first electrode and the second electrode, wherein the first electrode and the second electrode extend longitudinally in the first direction and are laterally adjacent one another. The conductive surface is electropolished.

According to another embodiment, an apparatus is provided for electropolishing a conductive surface on a wafer. The apparatus comprises a polisher and a moving mechanism. The polisher includes at least one cathode and at least one anode separated from one another by an isolation region. The moving mechanism is configured to rotate the wafer while moving the conductive surface linearly and parallel to a first direction along the isolation region, wherein moving the conductive surface linearly and parallel to the first direction varies exposure of relative surface areas of the conductive surface to the at least one cathode and the at least one anode.

According to yet another embodiment, an apparatus is provided for electropolishing a conductive surface on a wafer. The apparatus comprises a polisher, a contact, and a moving mechanism. The polisher includes at least one first electrode and at least one second electrode separated from one another by an isolation region. The at least one first electrode extends along a first side of the polisher and the at least one second electrode extends along a second side of the polisher. The contact is configured to contact an edge region of the conductive surface at the second side of the polisher to provide electrical connection to the conductive surface. The moving mechanism is configured to rotate the wafer while moving the conductive surface linearly and parallel to the first direction. Moving the conductive surface linearly and parallel to a first direction varies an exposure of relative surface areas of the conductive surface to the at least one first electrode and the at least one second electrode.

BRIEF DESCRIPTION OF THE DRAWINGS

FIGS. 3A-3B are schematic top views of exemplary electropolishing pads for use with the system shown in FIG. 2;

FIG. 4 is a detailed schematic cross-section of the electropolishing pad of the system shown in FIG. 2;

DETAILED DESCRIPTION

As will be described below, the present invention provides a method and a system to electropolish or electroetch, or electrochemically mechanically polish a conductive material layer deposited on a surface of a semiconductor substrate. The process, as described herein, performs electropolishing using an applied potential and a polishing or electropolishing pad that physically contacts the conductive surface during at least part of the process time. Electrochemical and mechanical polishing and removal of the conductive material are achieved through the use of the electropolisher or electropolishing pads described herein. The electropolishing pads each comprise at least one electrode to perform an electrochemical process on the conductive surface in the presence of a process solution. A pad layer with openings is placed on or over the at least one electrode and prevents the at least one electrode from touching the conductive surface of the wafer while mechanically assisting the removal process.

The electropolishing pad may be formed as a belt supported by a fluid cushion, where the belt moves during processing. Alternatively, the electropolishing pad may be a standard pad supported by a solid platform. In the latter case, the pad does not move relative to the solid platform during processing and it may or may not be directly attached to the solid platform. The pad and the solid platform may move together with respect to the wafer during processing. If the electropolishing pad is shaped as a belt that may move linearly in a unidirectional or bi-directional fashion, fluid pressure such as air pressure may be applied to a back surface of the electropolishing pad to push the polishing surface of the pad towards the conductive surface as the pad is moved.

Figure 1:
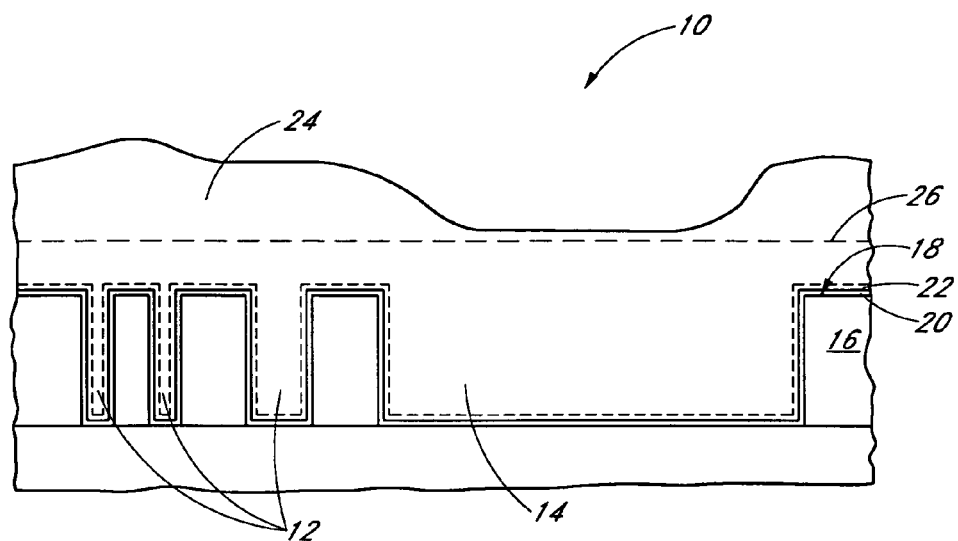
FIG. 1 is a schematic illustration of a copper-plated substrate.
Figure 2:
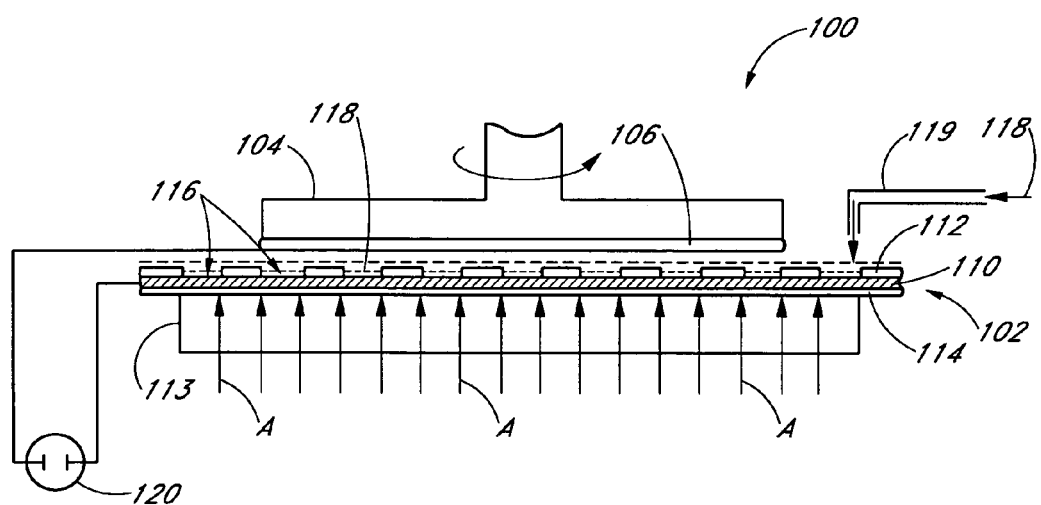
FIG. 2 is a schematic cross-sectional view of an electropolishing system according to an embodiment.

Reference will now be made to the drawings wherein like numerals refer to like parts. FIG. 2 illustrates an electropolishing system 100 in accordance with one embodiment of the present invention. The system 100 comprises an electropolisher or electropolishing pad 102 and a carrier 104 to hold a wafer 106 with a surface 108 to be electropolished using the system 100. In this embodiment, the surface 108 of the wafer 106 may include an electroplated conductive layer, as shown in FIG. 1. The carrier may rotate and move the wafer vertically, longitudinally, or laterally in a linear or orbital motion. The copper layer on the wafer surface may be a planar or non-planar layer, depending on the deposition process used. For example, an electrochemical mechanical deposition process (ECMD) yields planar copper deposits on wafer surfaces comprising cavities. An electrochemical deposition process (ECD) yields non-planar copper deposits over large cavities, as shown in FIG. 1. If the copper layer is non-planar, the electrochemical mechanical polishing or planarization approach has the capability to planarize the copper layer as it removes the unwanted overburden portion from the wafer surface.

The electropolishing pad 102 is the part of the system that allows performance of electrochemical and mechanical polishing on the surface of the wafer. The electropolishing pad 102 may comprise an electrode 110 and a polishing layer 112 placed on top of the electrode 110. Optionally, an insulating layer 114 may be placed under the electrode 110 to electrically insulate it from other system components. The insulating layer may be made of a flexible insulating material, such as a polymeric material. In the illustrated system 100, a support plate 113 supports the electropolishing pad 102. The support plate 113 may be made of any material that has resistance to the chemical environment of the system 100, such as a hard polymer, stainless steel, etc. As will be described more fully below, the electropolishing pad 102 may move together with the support plate 113, or a relative motion may be established between the electropolishing pad 102 and the support plate 113, using a moving mechanism. In the latter case, the electropolishing pad 102 may be shaped as a belt electropolishing pad.

The electrode 110 may be made of a conductor, such as metal, preferably shaped as a flexible and thin conductive plate or film. Webs of stainless steel, brass, copper, etc. may be used as the electrode 110. The electrode 110 may also be graphite or a conductive polymer layer or a layer coated with a conductive material. The electrode plate may be continuous and made of a single piece, or may be discontinuous comprising multiple pieces. In the illustrated embodiment, the polishing layer 112 is made of a polishing pad material, such as polymeric or fixed abrasive CMP polishing pad materials supplied by polishing pad manufacturers such as 3M of St. Paul, Minn., Mipox International Corporation of Hayward, Calif., and Rodel, Inc. of Phoenix, Ariz. The polishing layer 112 may include openings 116 exposing portions of the surface of the electrode 110 under it. Therefore, a process solution 118 filling the openings wets or contacts the exposed portions of the electrode 110. The process solution 118 is preferably delivered onto the electropolishing pad 102 through a solution line 119, or multiple solution lines, which are connected to a process solution supply tank (not shown).

As shown in FIGS. 3A and 3B, the openings 116 of polishing layer 112 may be shaped as holes or slits. Holes may have any geometrical form, such as round, oval, square or others. Similarly, slits may be continuous or discontinuous, having uniform or non-uniform width, parallel or non-parallel to each other. Slits may be formed as straight walled slits or slanted walled slits as well. The openings may be formed in a staggered manner across the polishing pad 102 to enhance electropolishing uniformity. Examples of such pads can be found in U.S. Pat. No. 6,413,388 entitled Pad Designs and Structures For a Versatile Materials Processing Apparatus and co-pending U.S. patent application Ser. No. 09/960,236 entitled Mask Plate Design, filed on Sep. 20, 2001, which are owned by the assignee of the present invention and incorporated herein by reference.

It is, however, contemplated that the polishing layer 112 may be made of a porous material layer, which may or may not include openings. In this case, the porous polishing layer is saturated with an electropolishing solution and keeps the solution between the wafer surface 108 and the exposed surface of the electrode 110. When delivered to the polishing layer 112, the process solution forms pools of process solution contacting the electrode 110. The thickness of the pad 102 may vary between 4 mils to 400 mils. The polishing layer 112 may actually be a multi-layer structure including a polishing layer at the top facing the wafer 106. Under the polishing layer 112, there may be other sub-layer or layers comprising soft and spongy materials. One such pad structure especially suited for processing wafers with ultra low-k dielectric layers is disclosed in U.S patent application Ser. No. 10/155,828 entitled Low Force Electrochemical Mechanical Deposition Method and Apparatus, filed May 23, 2002, which is owned by assignee of the present invention and incorporated herein by reference.

Referring back to FIG. 2, the electrode 110 and the surface 108 of the wafer 106 are connected to the terminals of a power supply 120. In an embodiment, as the surface 108 of the wafer 106 is lowered to contact the process solution 118, a potential difference is applied between the surface 108 and the electrode 110 by the power supply 120. During the process, the wafer is rotated and laterally or longitudinally moved as the surface 108 of the wafer physically contacts both the polishing layer 112, which has a polishing top surface, and the process solution 118 that is in contact with the electrode 110. As the potential difference is applied between the surface 108 and the electrode 110 during at least part of the process period, electropolishing is performed on the surface 108 of the wafer 106. It will be understood that in this application electropolishing is described as a process including anodizing the surface 108 and then mechanically polishing to remove at least part of the anodized surface layer, which may comprise passivating materials, such as oxides and/or other compounds, thereby removing the material from the surface 108. Anodization of the surface 108 is achieved by making the surface 108 more anodic with respect to the electrode 110 as the potential difference is applied between the electrode 110 and the conductive surface 108. It is possible to apply DC voltage, variable voltage or pulsed voltage, including reverse pulse voltage during the process.

FIG. 4 illustrates a detailed view of a portion of the electropolishing pad 102 as it is applied upon the surface 108 of the wafer 106 during the electropolishing process of an embodiment. Conductive surface regions 122 of the electrode 110 are exposed by the openings 116 in the polishing layer 112. These exposed surface regions will be referred to as active surfaces 122 of the electrode 110. The process solution 118 fills the openings 116 and establishes contact both with the active surfaces 122 and portions of the surface 108 of the wafer 106. When a potential is applied between the surface 108 of the wafer 106 and the electrode 110, process current passes through the process solution 118 filling the openings 116 between the active surfaces 122 of the electrode 110 and the surface 108 of the wafer 106. A top surface 124 of the polishing layer 112 may or may not contain abrasive material. The top surface 124 of the polishing layer 112 touches or sweeps the surface 108 of the wafer 106 at least for a period of time during the electropolishing process.

As described above, during the electropolishing process, applied potential difference between the electrode 110 and the conductive surface of the wafer 106 in the presence of the electropolishing solution 118 causes electrochemical oxidation or anodization/passivation of the surface 108, which is simultaneously polished with the electropolishing pad 102 to remove the oxidized, anodized or passivated layer from the top surface 108 of the wafer 106 where the pad 102 touches. The cavity regions that are not touched by the pad 102 contain the passivation layer, which slows down material removal from such regions. Faster material removal from the swept areas compared to un-swept cavities planarizes the structure, such as the one shown in FIG. 1. The process solution 118 may contain abrasive particles, e.g. 0.1-5 weight percent alumina, ceria or silica particles, to assist in the efficient removal of the surface oxide or passivation layer.

It will be appreciated that the illustrated embodiments utilize an electrode structure in the electropolishing pad, which is exposed through the openings in the polishing layer as active surfaces. Although in the described embodiments these exposed portions are shown as substantially flat surfaces, they may be configured in many shapes and sizes, such as brushes, rods, or beads, that are placed in the polishing layer openings, as long as their height does not exceed beyond the top surface 122 of the polishing layer, which would undesirably cause them to physically touch the surface 108 and electrically short the electrode to the surface 108. Examples of various electrode designs used in electrochemical mechanical processes are found in U.S. patent application Ser. No. 10/391,924, filed on Mar. 18, 2003, entitled Electroetching System and Process, which is owned by the assignee of the present invention, the disclosure of which is incorporated herein by reference.

Figure 5:
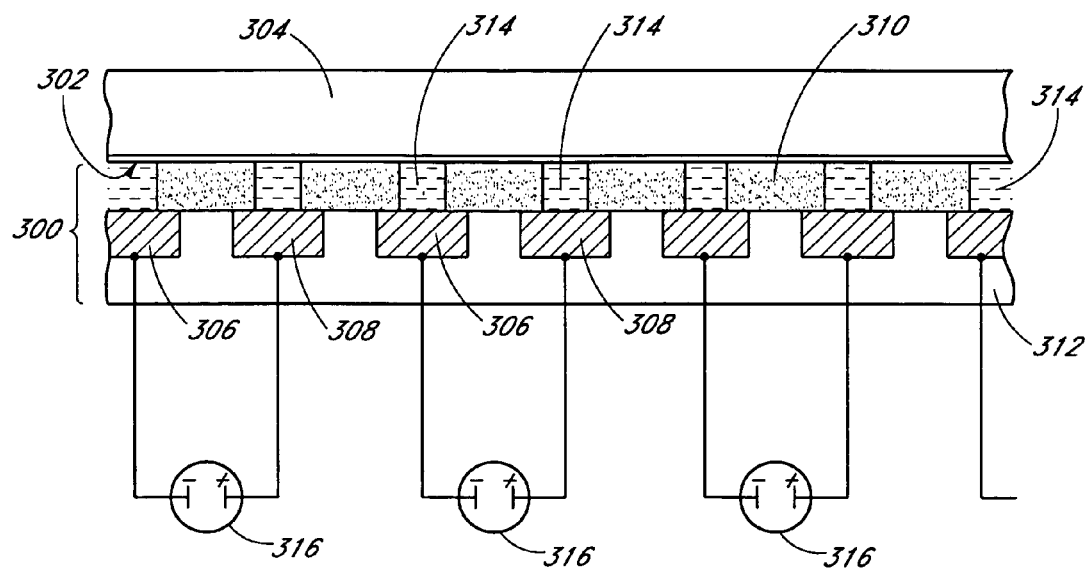
FIGS. 5-6 are schematic cross-sections of electropolishing pads including multiple electrodes.
Figure 6:
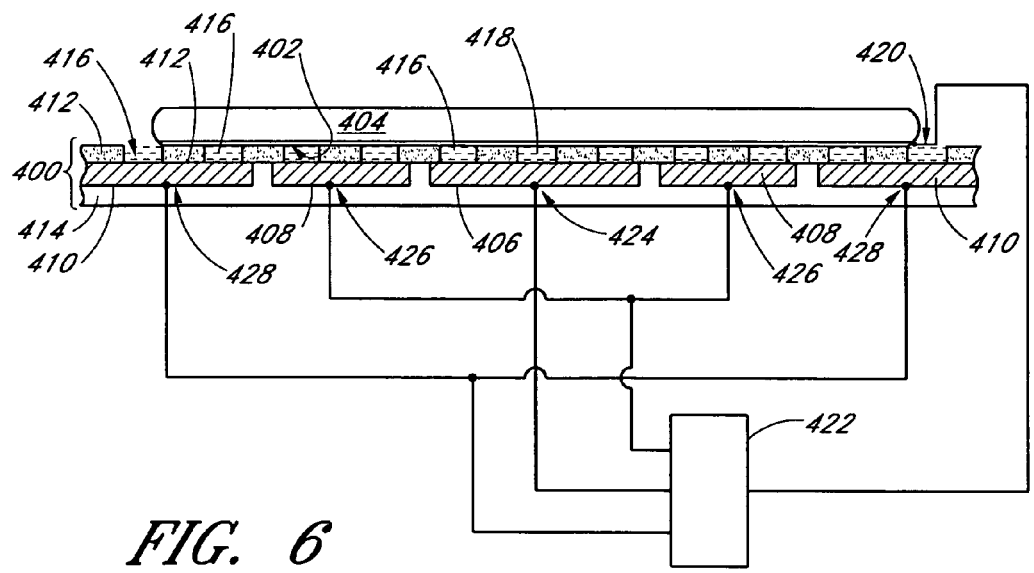

FIGS. 5 and 6 illustrate various embodiments of an electropolisher or electropolishing pad, which may be designed as a belt electropolishing pad that moves during processing, or an electropolishing pad, which may be fixed on the support plate. For example, FIG. 5 illustrates an embodiment of an electropolishing pad 300 that is in contact with a surface 302 of a wafer 304. The electropolishing pad 300 comprises an electrode layer comprising cathode electrodes 306 and anode electrodes 308, which are paired and isolated from one another, and placed between a polishing layer 310 and an insulating layer 312. In this embodiment, the insulating layer 312 also fills the space between the electrodes 306, 308 to electrically isolate them from one another. Openings 314 of the polishing layer 310 expose the cathode and anode electrodes 306, 308 and are filled with a process solution, which is dispensed on top of the electropolishing pad 300. The anodic current to the surface 302 of the wafer is provided through the process solution touching an anode electrode 308 and leaves the surface 302 through the process solution touching a cathode electrode 306. Each of such configured anode-cathode pairs is connected to at least one power supply 316 to apply an electropolishing potential between them during the process.

FIG. 6 illustrates another embodiment of an electropolishing pad 400 that is in contact with a surface 402 of a wafer 404. The electropolishing pad 400 comprises an electrode layer that has multiple sections 406, 408 and 410 that are substantially electrically isolated from one another. The sections 406-410 are positioned between a polishing layer 412 and an insulating layer 414. The electrode sections 406-410 may be arranged in a concentric fashion around each other so that each section is responsible for electropolishing of a corresponding concentric location on the surface 402 of the wafer 404. Such concentric locations on the surface 402 of the wafer 404 are edge and central regions of the wafer 404. Sectioned electrodes can be used to control uniformity of material removal from the surface 402. In this embodiment, the insulating layer 414 also fills the space between the electrode sections 406-410 to electrically isolate them from one another. The sectioned electrodes 406-410 are exposed by the openings 416 in the polishing layer 412, which are filled with a process solution 418 that is dispensed on the pad 400. Electrical contact to the surface 402 may be made using a surface contact 420 touching the wafer surface, preferably at an edge region of the wafer 404. The surface contact 420 may be connected to a power supply unit 422 including a power control device. Each electrode section 406-410 is also connected to the power supply unit 422 using electrode contacts 424, 426 and 428, respectively. The power unit 422 is able to provide current to each electrode during the process to control uniformity of material removal from the surface 402. The power unit 422 may comprise a single power supply or multiple power supplies, one or more for each section of the electrode layer. The current or voltage provided by the power unit 422 may be varied during the process for improved uniformity.

As mentioned before, if the electropolishing pad is not designed as a moving belt, it may be attached to and fixed on the support plate. Alternatively, the pad may not be attached to the support plate but may be simply supported by the plate. In both cases, the wafer is pressed against the electropolishing pad and rotated and may be translated laterally or longitudinally during the process. In such designs, the support plate 113, along with the electropolishing pad, may also be rotated and otherwise moved with respect to the wafer. Such processes are exemplified in U.S. Pat. No. 6,176,992, entitled "Method and apparatus for electrochemical mechanical deposition," which is owned by the assignee of the present invention and hereby incorporated herein by reference.

Depending on the system requirements, the support plate may or may not provide air flow, depicted with arrows 'A' in FIG. 2, under the electropolishing pad. As will be described more fully below, if the electropolishing pad is designed as a belt that moves with respect to the support plate, for example, air flow is preferably used to push the belt shaped electropolishing pad towards the surface of the wafer and to thereby minimize or eliminate any friction between the moving belt and the support plate. Alternatively, if air flow is not present and there is physical contact and relative motion between the belt-shaped electropolishing pad and the support plate, a low friction material, such as Teflon®, may be used at the interface between the polishing pad and the support plate. It is also possible to apply force onto the back surface of the belt by placing it across from a fluid source and applying fluid flow from the fluid source to the under-side or back side of the belt shaped electropolishing pad. As will be described below, this fluid source can take the form of a showerhead. A fixed gap is established between the showerhead and the belt shaped electropolishing pad and by flowing fluid, such as air, onto the backside of the belt shaped electropolishing pad, the belt shaped polishing pad is pushed or urged towards the wafer surface. One exemplary system using a showerhead to apply fluid on the back side of a polishing belt is described in U.S. patent application Ser. No. 10/761,877, filed on Jan. 21, 2004, entitled "Chemical mechanical polishing method and apparatus for controlling material removal profile" which is owned by the assignee of the present invention and incorporated herein by reference.

Figure 7A:
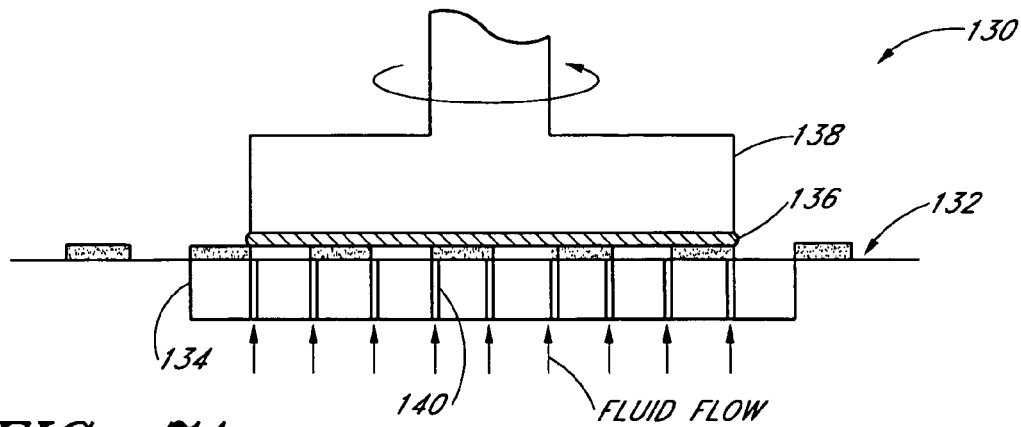
FIGS. 7A-7C are schematic cross-sections of electropolishing systems using a belt shaped electropolishing pad and showerhead of an embodiment.
Figure 7B:
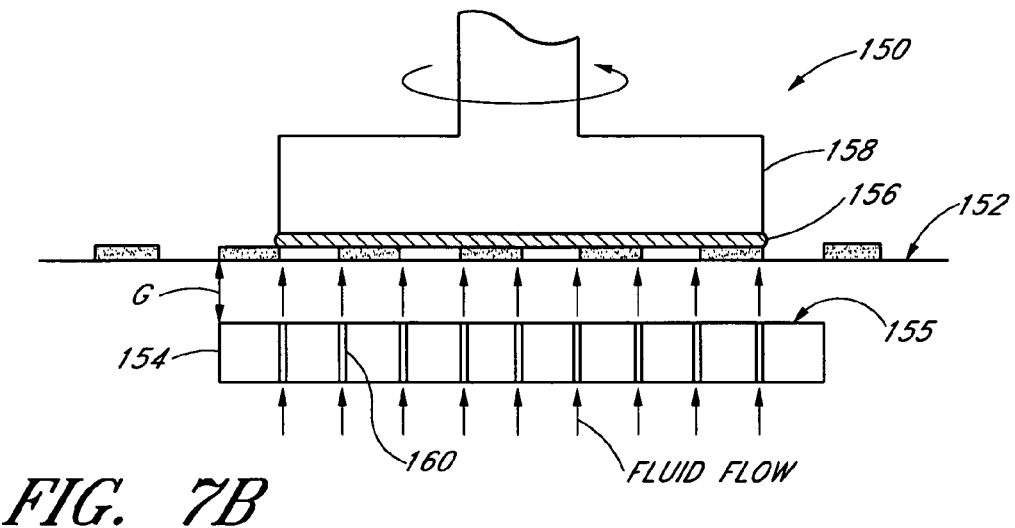
Figure 7C:
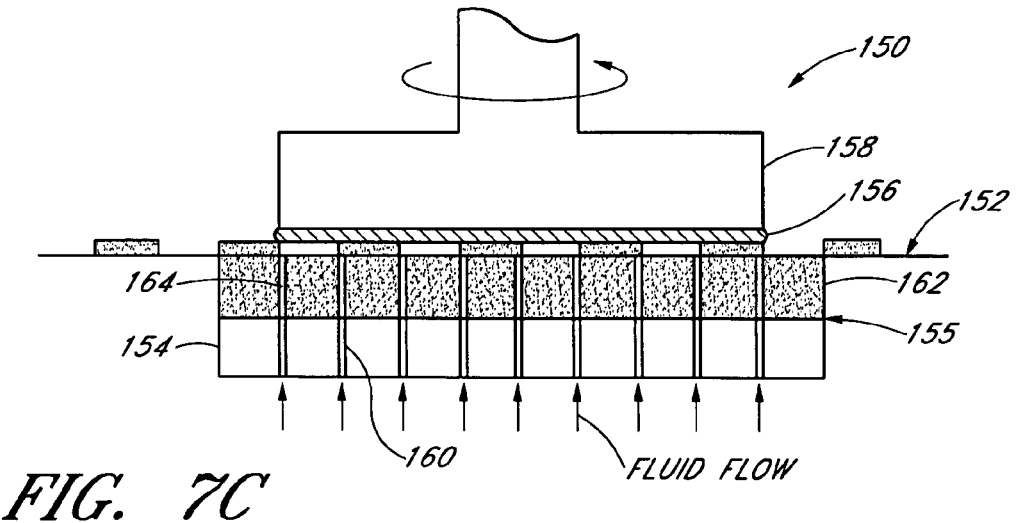

FIGS. 7A-7C exemplify systems using a belt shaped electropolisher or electropolishing pad or belt pad with either a support plate or a showerhead. In these systems, relative motion is established between the belt pad and the support plate or the showerhead. FIG. 7A illustrates an electropolishing system 130 using a belt pad 132 supported by a support plate 134. A wafer 136 to be electropolished is held by a wafer carrier 138. The belt pad 132 is moved linearly by a moving mechanism (not shown) on the support plate 134. In this system, to enable polishing action on the wafer 136, a relative motion can be established between the support plate 134 and the belt pad 132, whether or not a fluid flow, e.g., air flow, is provided through the support plate 134. As described above, air flow may be delivered to the backside of the belt pad 132 through openings 140 in the support plate 134 while the wafer surface is polished by the belt pad 132. Alternatively, the belt pad 132 may be kept motionless on the support plate, or may be secured on the support plate 134 by applying suction through the openings 140.

FIG. 7B illustrates another preferred embodiment of the electropolishing system 150 using a belt pad 152 pushed by the airflow or fluid flow from a showerhead 154. The belt-pad 152 is positioned a fixed distance apart from a top surface 155 of the showerhead so that a gap 'G' is formed between the belt pad and the showerhead 154. A wafer 156 to be electropolished is held by a wafer carrier 158. The belt pad 152 is moved linearly by a moving mechanism (not shown) above the showerhead while the air flow is applied to the backside of the belt pad 152. In this system, to enable polishing action on the wafer 156, relative motion can be established between the showerhead 154 and the belt pad 152 and the wafer 156 as the air flow is supplied to the gap 'G' through the showerhead 154. Air flow is delivered to the backside of the belt pad 152 through openings 160 in the showerhead 154 while the wafer surface is polished by the belt pad 152.

As illustrated in FIG. 7C, the top surface 155 of the showerhead may include a buffer 162. The buffer 162 may be a compressible material layer or an inflatable bladder or the like filling the gap 'G'. The buffer 162 enhances the polishing of the wafer surface as the wafer 156 is pressed on the belt pad 152 by the wafer carrier 158. The buffer 162 may have openings 164 corresponding to the openings 160 in the showerhead 154 so that in case fluid flow is utilized, the fluid or air can flow through the buffer 162 as well. If air flow is not utilized, force may be applied to the belt pad 152 by the buffer 162.

Figure 8A:
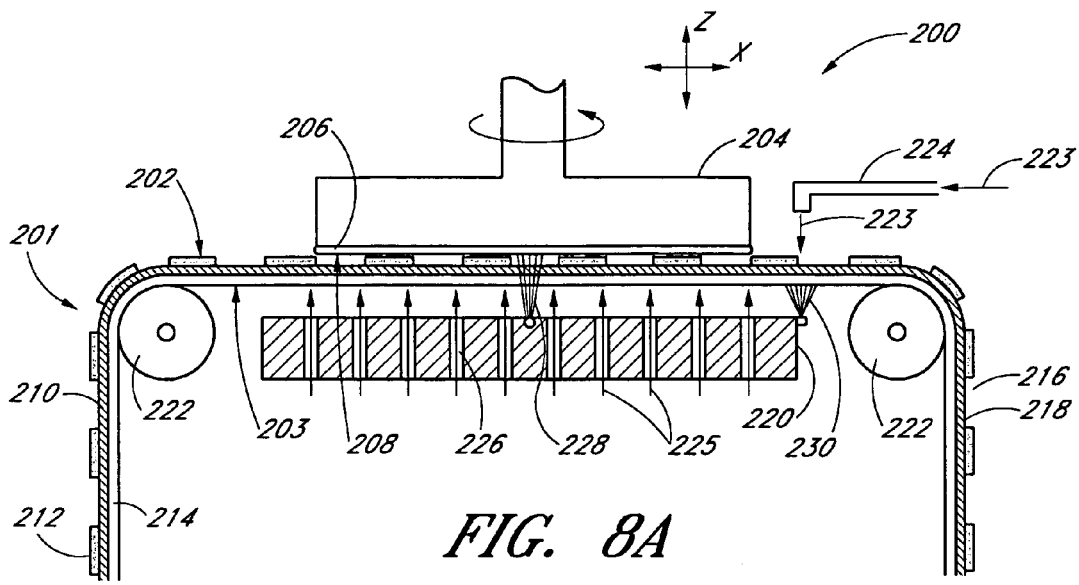
FIGS. 8A-8C are schematic cross-section, plan and cross-section views of an embodiment of an electropolishing system using a belt pad with a showerhead.
Figure 8B:
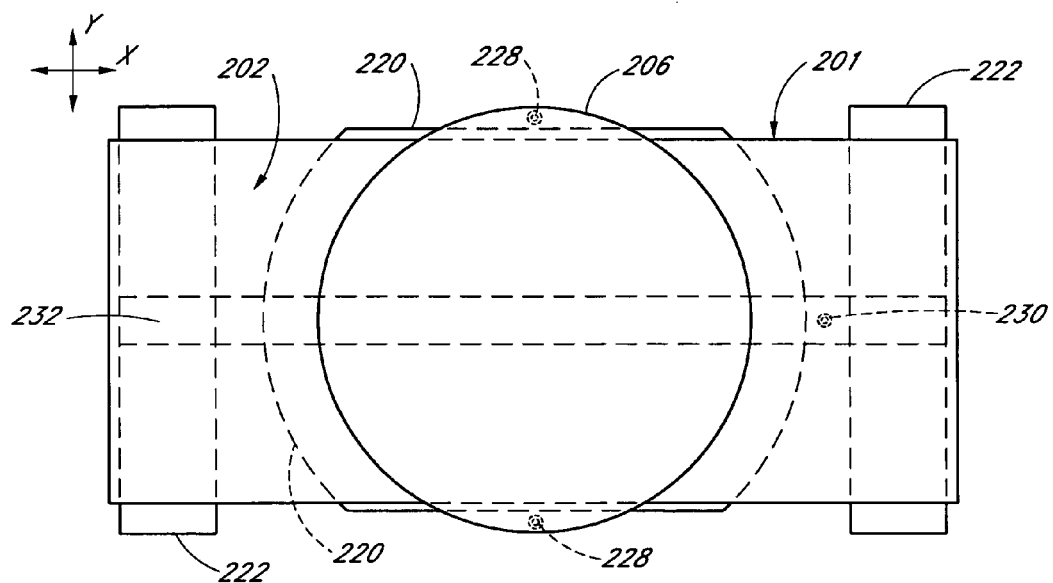
Figure 8C:
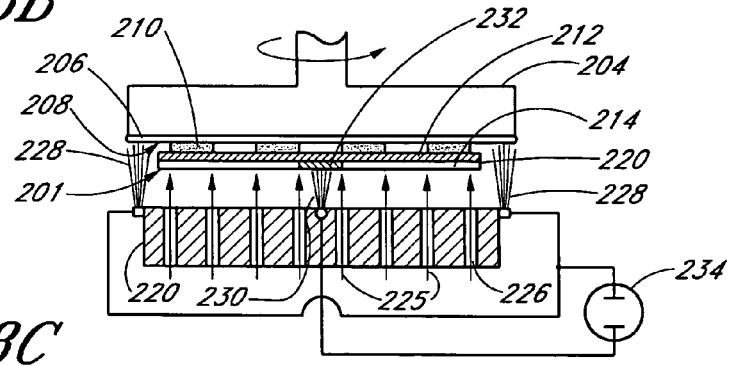

FIGS. 8A-18B will exemplify various embodiments of the electropolisher and showerhead combinations. Initially, the general system described in 7B will now be described more fully in connection with FIGS. 8A-8C. For purposes of clarity, a new set of reference numerals will be used to describe FIGS. 8A-8C. FIGS. 8A-8C illustrate an electropolishing system 200 using an electropolisher 201 or belt electropolishing pad or belt pad. The belt pad 201 comprises a front surface 202 and a back surface 203. As shown in FIG. 8A in a side view, the system 200 further comprises a wafer carrier 204 to hold a wafer 206 with a front surface 208 (facing downward in FIG. 8A) to be processed. The surface 208 of the wafer may comprise a conductive layer filling features, which is similar to the one shown in FIG. 1.

In this embodiment, the belt pad 201 comprises an electrode 210 or electrode layer, a polishing layer 212 and an optional insulating layer 214, which are all as described in connection with FIGS. 2-4. It should be noted that the insulating layer may not be used. Openings 216 in the polishing layer 212 expose active surfaces 218 of the electrode layer 210. Accordingly, in this embodiment, the polishing layer 212 and the active surfaces 218 of the electrode 210 form the front surface 202 and the back side of the insulating layer 214 forms the back surface 203 of the belt pad 201. The belt pad 201 is placed between the carrier head 204 and a showerhead 220, and supported and tensioned by support structures 222 such as rollers. The belt pad 201 is moved on the rollers 222 either in a unidirectional or bi-directional (back and forth) linear manner by a moving mechanism (not shown). The belt pad 201 may be dimensioned and shaped in any variety of ways. Accordingly, the belt pad may be manufactured as a short belt pad section which can be moved bi-linearly by the moving mechanism. Further, the belt pad may be manufactured as a long belt which is on a supply spool and extended between the supply spool and a take-up spool. After a certain process time, the belt pad 201 is advanced and wound on the take-up spool. Alternatively, the belt pad 201 may be manufactured as an endless loop.

A process solution 223 for electropolishing is delivered to the belt pad 201 from a solution line 224. However, if the belt pad 201 moves in a bi-directional or reverse linear way, e.g., to the right and left in FIG. 8A, two solution lines are preferred so that one line is located at the right side of the wafer and the other one is located at the left side of the wafer 206. Air flow 225 from the showerhead 220 is provided to urge the belt pad 201 against the surface 208 of the wafer 206. Air is flowed through holes 226 in the showerhead 220 and may be supplied from an air-supply unit (not shown). It should be noted that the showerhead 220 may comprise more than one flow zone and air flow may be provided at different rates at various zones, such that pressure on the wafer surface 208 corresponding to the different zones may be varied for best removal rate control. Electrical connection to the surface 208 of the wafer 206 may be made using surface contacts 228 touching the edge of the surface 208 as the wafer 206 is moved or a relative motion between the surface contacts and the surface 208 is provided. Electrical connection to the electrode may be made using electrode contacts 230. As will be described with reference to the FIGS. 8B-8C, the electrode contacts 230 may either directly contact the moving electrode, preferably through an opening in the insulating layer if an insulating layer is employed in the belt pad structure, or indirectly by touching an extension piece attached to the electrode. In either case, relative motion between the electrode and the electrode contact 230 is provided. There would be no need for the electrode contact 230 to slide over the electrode (i.e. no relative motion) if a contact is attached to the electrode away from the process area and it moves with the belt pad 201 back and forth in a bi-directional or reverse linear manner. Surface and electrode contacts 228, 230 may be made of conductive brushes, rollers, cylinders, wires, flexible foils or shims and the like.

In one embodiment, the electrical contacts may be supported along the edge of the showerhead 220, as shown in FIG. 8A, although they may alternatively be supported by other system components also. Of course, if the showerhead is made of an electrically conductive material, the contacts are electrically isolated from the body of the showerhead 220.

FIG. 8B is a top view of the electropolisher in the form of a belt pad, positioned over the rollers 222, and the positions of the wafer 206 and the showerhead 220 are indicated. FIG. 8B also shows positions of the surface contacts 228 to the wafer 206 and electrode contact 230 to the belt pad 201. It should be noted that more than one electrical contact to the belt electropolisher 201 may be employed. Further, contact to the wafer 206 may be made at its front edge region, as shown, or at its bevel or even at its back edge region if the conductive material on the surface of the wafer 206 extends to the bevel or wraps around to the back edge region of the wafer 206. As shown in FIG. 8B, the diameter of the wafer 206 is larger than the width of the belt pad 201, and therefore an exposed edge portion of the rotating conductive surface of the wafer 206 is continuously contacted by the surface contacts 228. If electrical contact could be made at the back edge region of the wafer 206, then the width of the belt pad 201 could be made larger than the diameter of the wafer 206.

As shown in FIGS. 8B-8C, in this embodiment, the surface contacts 228 are positioned along both sides of the belt pad 201 to touch the edge of the wafer 206 at both sides of the belt 201. This double side configuration of the surface contacts 228 will be referred to as double side surface contacts hereinbelow. The electrode contact 230 touches an electrode extension piece 232 shown as a dotted strip in FIG. 8B to conduct electricity to the electrode. Alternatively, the insulating layer 214 may not be included in the structure of the belt pad 201, in which case substantially the whole backside surface of the electrode layer facing the showerhead 220 would be exposed. This would make the whole backside surface available for electrical connection at any point.

As shown in FIG. 8C in an end cross-sectional view, the extension piece 232 is in contact with the electrode 212 and is placed in the insulating layer 214. The electrode contact 230 touches the extension piece 232 as the belt pad 201 is moved. As also shown in FIG. 8C, the double side surface contacts 228 touch the edge of the surface 208 of the wafer 206. Both the double side surface contacts and the electrode contacts are connected to a power supply 234, which applies a potential difference between them.

It will be appreciated that each embodiment of the present invention utilizes electrical contacts that deliver or receive the process current while the surface that they are touching is in motion or vice-versa. Examples of electrical contacts touching a surface or an edge region of a surface of a wafer during an electrochemical or an electrochemical mechanical process can be found in the following U.S. Patents and Published U.S. Applications, all of which are owned by the assignee of the present invention and hereby incorporated herein by reference. U.S. Pat. No. 6,497,800, entitled Device Providing Electrical Contact to the Surface of a Semiconductor Workpiece During Metal Plating and U.S. Pat. No. 6,482,307, entitled Method and Apparatus for Making Electrical Contact to Wafer Surface for Full-Face Electroplating or Electropolishing, disclose electrical contacts touching the surface of a wafer for full face electrochemical mechanical processing of the surface. U.S. Pat. No. 6,610,190, entitled Method and Apparatus For Electrodeposition of Uniform Film with Minimal Edge Exclusion on Substrate, discloses electrical contacts touching an edge region of a surface of a wafer for full face electrochemical mechanical processing of the surface. U.S. Patent Application Publication No. 2003/0089598, entitled Method and System to Provide Electrical Contacts for Electrotreating Processes, also discloses various embodiments of electrical contacts.

Referring again to FIGS. 8A-8C, in an exemplary electropolishing process of the surface 208 of the wafer 206, the wafer 206 is rotated and optionally also laterally moved in proximity of the front surface 202 of the belt pad 201. The surface 208 may be swept by the polishing layer 212 throughout the electropolishing process or for a period of time during the process while air flow is applied to the back surface 203 of the belt pad 201. The belt pad 201 is moved linearly as described above while the electropolishing solution 223 is delivered onto it. An electropolishing potential is applied between the surface 208 and the electrode 210 by the power source 234 to perform electropolishing of the surface 208.

Figure 9:
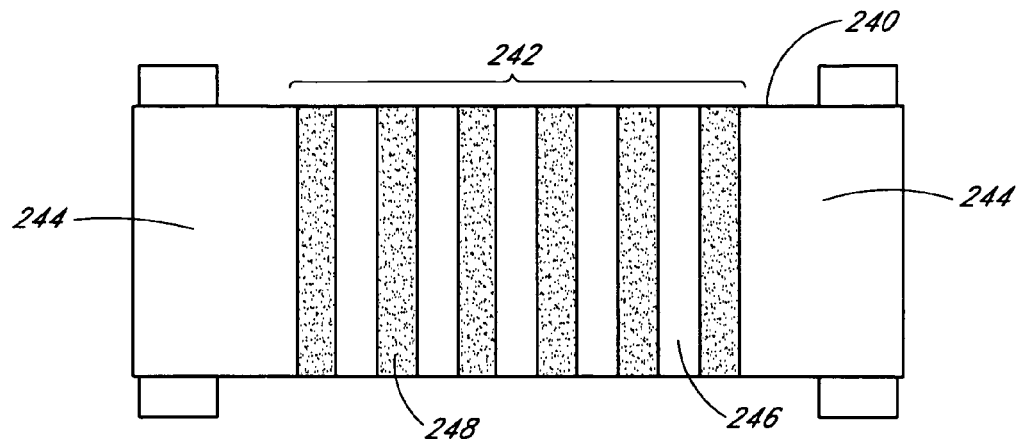
FIG. 9 is a schematic plan view of an electropolishing belt pad with a process section, wherein the process section includes multiple electrode layers and polishing pad layers.

FIG. 9 shows an electropolisher 240 shaped as a polishing belt or polishing belt pad in a top view. The electropolisher 240 is comprised of a process section 242 and insulating sections 244. The process section 242 may be placed between the insulating sections 244 by attaching both ends of the process section 242 to the insulating sections 244. The insulating sections 244 are made of flexible insulating layers. Alternatively, the process section 242 may be placed on a belt shaped insulating layer to form the design shown in FIG. 9. The process section 242 includes an electrode layer 246 and a polishing or pad layer 248 to polish a wafer, where the polishing layer 248 has openings to expose portions of the electrode layer 246, as described for the above embodiments. The insulating sections 244 are connected to a moving mechanism (not shown) that can move the electropolisher 240 bi-directionally or unidirectionally. During the process, the conductive surface of the wafer is placed on the process section 242 and electrical contacts to the wafer surface and the electrode layer 246 are made, for example, by contacts similar to those shown in the systems of FIGS. 8A-8C or in FIGS. 11A-11B. An electropolishing solution can be delivered onto the electropolisher 240. Alternatively, the design shown in FIG. 9 can be formed as a belt with multiple process and insulating sections, which may be supplied from a supply spool and picked up by a take-up spool (not shown). The belt pad 240 may be used either with the support plate or the showerhead shown in FIGS. 7A-7C.

Figure 10A:
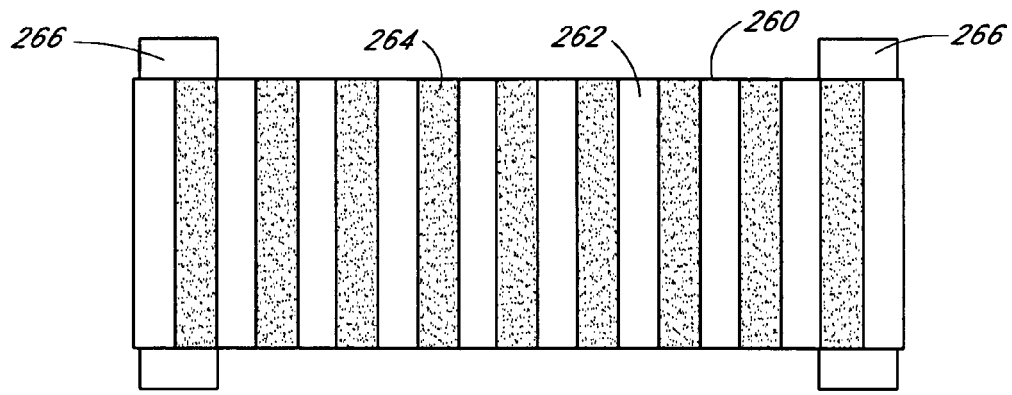
FIGS. 10A-10B are schematic plan and side views of a conductive belt including polishing pad layers.
Figure 10B:
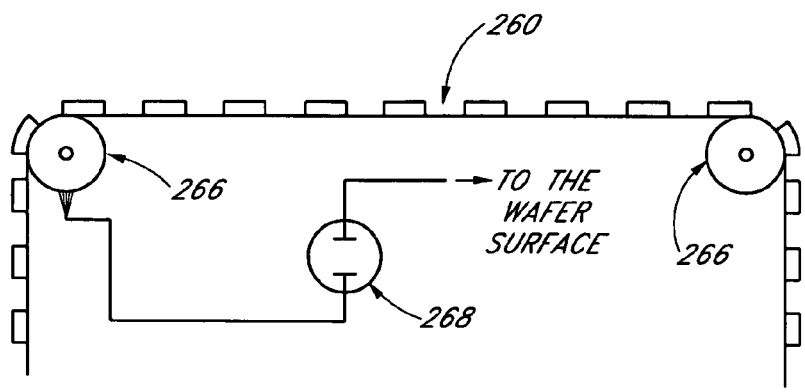

FIGS. 10A-10B illustrate an alternative electropolisher 260 or electropolishing pad in a top view and a side view. The electropolisher 260 is comprised of an electrode layer 262 and a polishing or pad layer 264 placed on top of the electrode layer 262. The belt pad 260 does not include an insulating layer. The belt pad 260 polishes a surface of a wafer during the electropolishing process. In fact, the electropolisher 260 is a conductive belt or a belt electrode having a pad section or sections on it. In this embodiment, the electrode layer 262 is made of a flexible electrically conductive material and shaped as a belt, thereby connected to a moving mechanism from both ends. Electrical connection to the electrode layer 262 is made through any of conductive part of the moving mechanism that is in direct contact with the electrode layer 262. As exemplified in FIG. 10B, rollers 266 with which the electrode layer 262 is in contact may be connected to a terminal of a power supply 268, which also connects the electrode layer 262 to the same power supply. The wafer surface is connected to another terminal of the power supply. The design shown in FIGS. 10A-10B can be alternatively formed as a short belt or a long one, which may be supplied from a supply spool and picked up by a take-up spool. The electropolisher 260 can be used either with the support plate or the showerhead shown in FIGS. 7A-7C. During the process, a wafer surface is placed on the electropolisher and electrical contact to the wafer surface is made using the surface contacts shown in the systems of FIGS. 8A-8C or in FIGS. 11A-11B. An electropolishing solution can be delivered onto the electropolisher. The principles of the embodiments described above in connection with FIGS. 9, 10A and 10B can also be applied to electropolishers that are fixed on a support plate or kept on a plate using various means, such as vacuum suction. Such alternative electropolishers can be moved by moving their support plates.

Figure 11A:
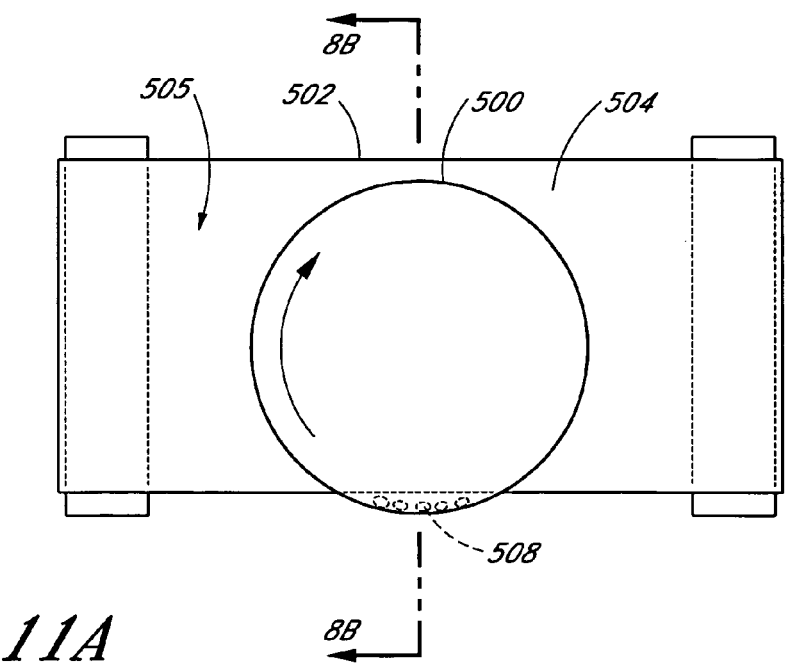
FIGS. 11A-11B are schematic plan and cross-section views of an electropolishing system using surface contacts.
Figure 11B:
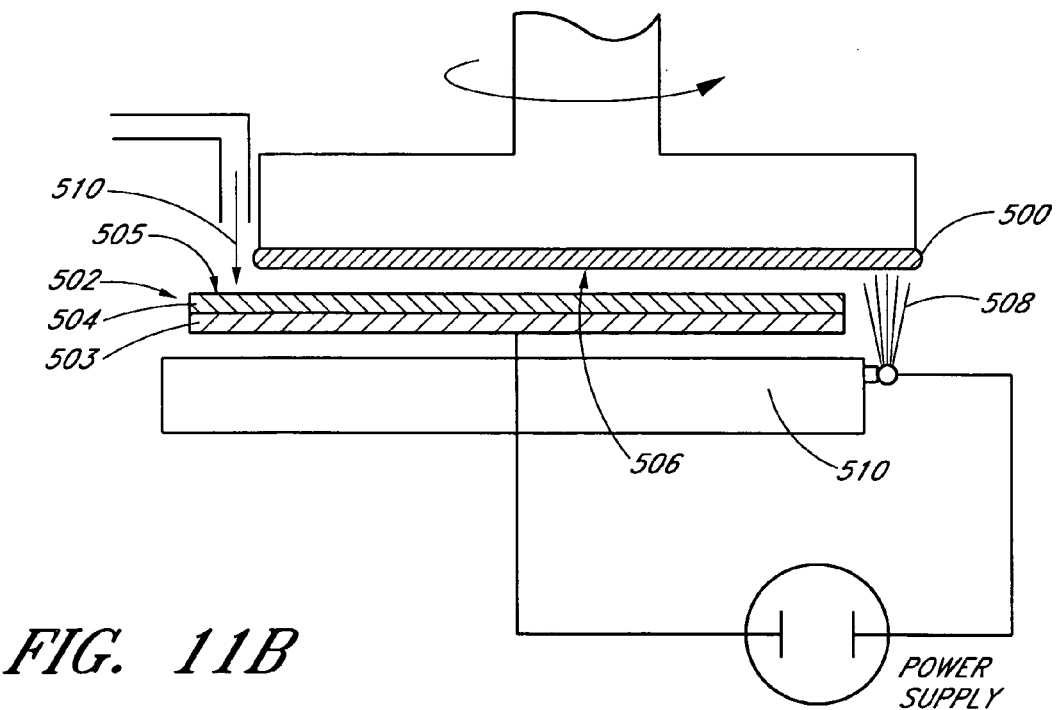

As exemplified above with reference to FIGS. 8A-8C, electrical connection to wafer surface is generally made through the double side surface contacts touching the wafer surface along the two edges of the long sides of the electropolishing pad or belt pad. An alternative surface contact configuration will now be described with reference to FIGS. 11A-11B. FIGS. 11A-11B show, in a top view and a side view, respectively, a wafer 500 held over a belt pad 502 having an electrode 503 and a polishing layer 504 with a polishing surface 505. A conductive surface 506 of the wafer 500 is electropolished as a process solution 510, for example an electropolishing solution, is delivered to the belt pad 502. The polishing layer 504 may be porous or may have openings that are not shown for the purpose of clarity in FIGS. 11A-11B. The process solution fills the openings or pores of the polishing layer 504 and electrically connects the electrode 503 to the conductive surface of the wafer 500 through the solution, which is conductive, during electropolishing.

Surface contact or contacts 508 are located adjacent one side of the belt pad 504 so that they can touch the edge of the wafer surface 506 only at that side as the wafer is rotated over the polishing layer 504 and the surface 506 is electropolished or planarized. This configuration of the surface contacts 508 will be referred to as single side surface contacts. As is well known in the field of electropolishing, the wafer surface 506 is made more anodic compared to the electrode for electropolishing or planarization. The single side surface contact configuration of the present invention may alleviate (compared to the preciously described double side surface contact configuration) any small material removal differences between the edge region where the electrical contacts are made and the center/middle region of the surface. Such differences may give rise to lower material removal rate at the edge region for the electropolishing process. The reason is that a very limited area touching the contacts at the edge of the surface intermittently leaves the process area on the polishing surface to be contacted by the side contacts as the wafer rotates. Therefore, that portion of the wafer surface does not get processed during the brief period that it stays off the polishing surface. This may cause less material removal from the edge region in comparison to the center, which is always on the process area of the polishing layer 502 and which is electropolished without interruption.

As described above, in one embodiment, the belt pad may be released from a supply spool and picked up by a storage spool or it may be an endless loop. In this embodiment, the belt pad may be moved linearly in a unidirectional or bi-directional manner. As described with respect to the previous embodiments, the belt pad 502 is placed over a showerhead 510, which may be made of a conductor or an insulator. Fluid flow from the showerhead 510 may be used to urge the belt pad against the surface of the wafer. The upper surface of the showerhead 510 may include a compressible layer, or a buffer layer if the belt pad does not include one. Such compressible layers may also be used to urge the belt pad towards the wafer surface at a predetermined force. The electropolishing processing of the surface occurs on a process area of the belt pad. The process area is the predetermined length of the polishing surface of the belt pad that is used for processing of the wafers. After using the process area of the belt pad for processing a predetermined number of wafers, the process area can be replaced by releasing an unused belt portion from the supply spool while taking up the used portion over the storage spool.

The belt pad may also be incrementally advanced during processing of the wafers. Pad conditioning may or may not be used on the polishing layer of the pad. Alternatively, the process area may be the whole belt if a unidirectional linear motion is imparted to the belt, e.g., the belt pad is in the form of a loop. In case the belt pad moves in bi-directional linear way, the portion of the belt pad that makes contact with the wafer surface defines the process area. As mentioned above, the polishing layer of the belt pad may include openings or channels. The openings or channels may be configured into certain patterns to affect material removal rate and removal profiles. Each predetermined process area length of the belt pad may have the same opening pattern or different patterns affecting the material removal rate. For example, a belt pad having a first process area with a first pattern of openings removes copper with a first removal rate. Similarly, a second process area of the belt pad with a second opening pattern removes the material with a second removal rate different from the first. The opening patterns also affect the removal profiles, with usually larger openings causing higher removal rates for more chemical processes. For more mechanical processes, the converse may be true, i.e., areas with larger polishing layer sections may remove material at higher rate. Using certain patterns one can control the removal profile and provide an edge high, a center high or uniform removal profile.

Figure 12:
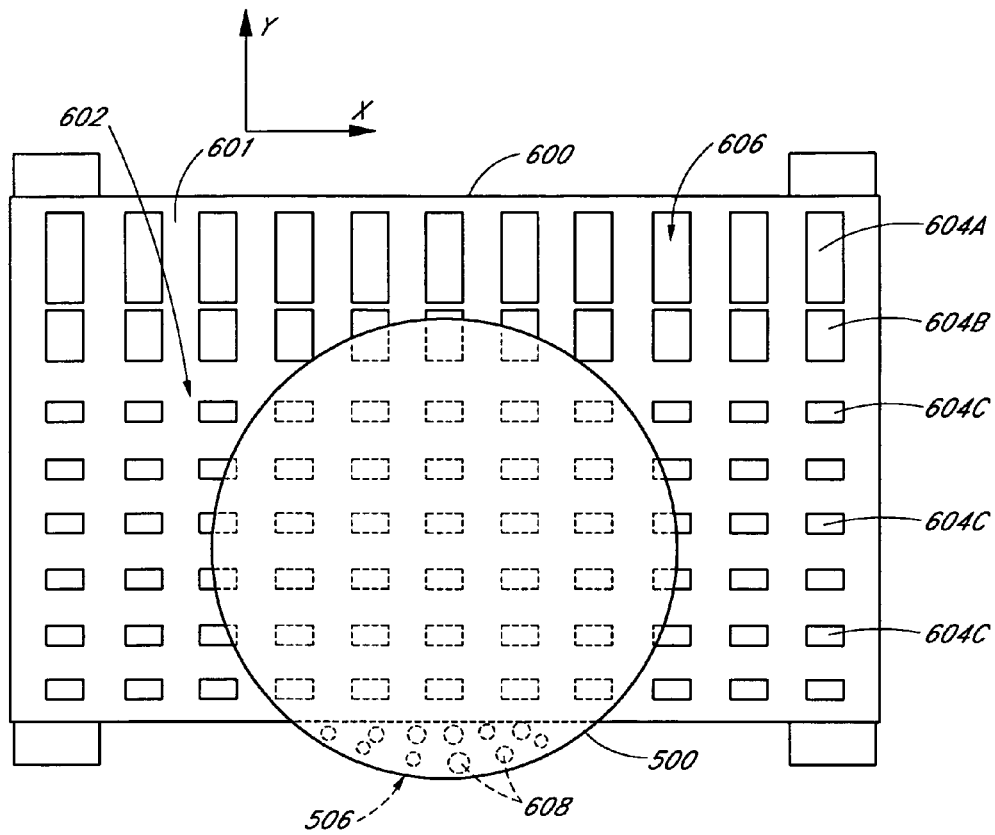
FIG. 12 is a schematic plan view of an exemplary electropolishing pad with a predetermined opening pattern.

In one embodiment, the material removal difference between the edge and the center regions in wafer may be alleviated or eliminated by controlling the size and design of the openings in the belt pad, preferably openings with varying size and shape. The openings may be configured in various sizes and patterns, as described above. FIG. 12 illustrates an exemplary belt pad 600 including a polishing layer 601 with a polishing surface 602 having openings 604, which expose the underlying electrode surface 606. In this embodiment, surface contacts 608 are in single side contact configuration, i.e., located at one side of the belt pad 600 to establish electrical connection with the edge of the surface of the rotating wafer 500. The wafer 500 is also held and rotated and also optionally moved laterally by a small amount by a carrier head, which is omitted to simplify the figures.

The openings may have more than one size, such as first size openings 604A, second size openings 604B and third size openings 604C. The first size openings 604A are the largest so they enable highest material removal. The second size openings 604B are made larger than the third size openings 604C to increase material removal from the edge region of the surface of the wafer 500 during the electropolishing, to compensate for the amount that is not removed because of the above explained discontinuous electropolishing of the edge region. Material removal rate from the second openings 604B is thus higher than that from the third openings 604C. Accordingly, the polishing layer is designed such that the second size openings 604B are placed on the path of the edge of the rotating wafer surface. Furthermore, by moving the wafer 500 laterally in the y-direction, as shown in FIG. 12, the edge of the wafer 500 may be exposed to even larger openings, i.e., the first size openings 604A to further increase the removal rate at the wafer edge.

In this embodiment, control of material removal from the wafer surface is achieved by employing different size openings. As a result, a uniform electropolishing profile is obtained over the whole surface of the wafer 500 as the material is removed from the surface. It should be noted that the shapes and organization of the openings of the pad in FIG. 12 are provided only for describing the principles of the present invention. The openings, in this embodiment, may be formed in a staggered manner across the polishing pad to enhance electropolishing uniformity. Examples of such pad opening designs can be found in the above mentioned U.S. Pat. No. 6,413,388, entitled Pad Designs and Structures For a Versatile Materials Processing Apparatus and the co-pending U.S. patent application Ser. No. 09/960,236, entitled Mask Plate Design, filed on Sep. 20, 2001, which are both owned by the assignee of the present invention and hereby incorporated herein by reference. Openings for uniform processing may be in the form of holes, slits or other shapes. In this or in the following embodiments, use of a support plate, a showerhead or a polishing solution can be similar to the embodiments described with respect to FIGS. 11A and 11B.

Figure 13:
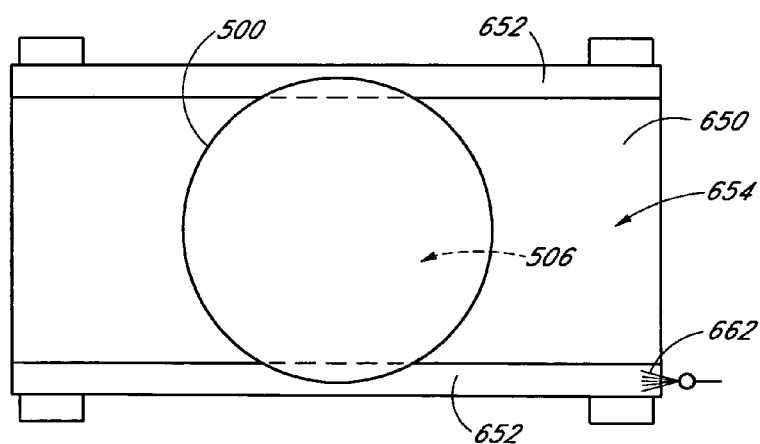
FIG. 13 is a schematic plan view of a belt electropolishing pad with embedded surface contacts which are configured as two conductive strips placed parallel to the direction of the lateral motion of the electropolishing pad.
Figure 14A:
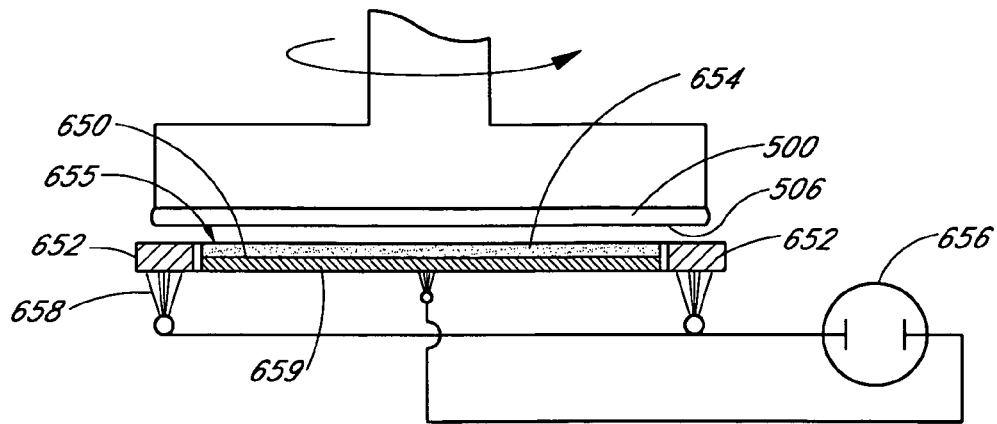
FIGS. 14A-14C are schematic illustrations of various embodiments, wherein surface contacts and an electrode layer are connected to a power supply, using contact elements.
Figure 14B:
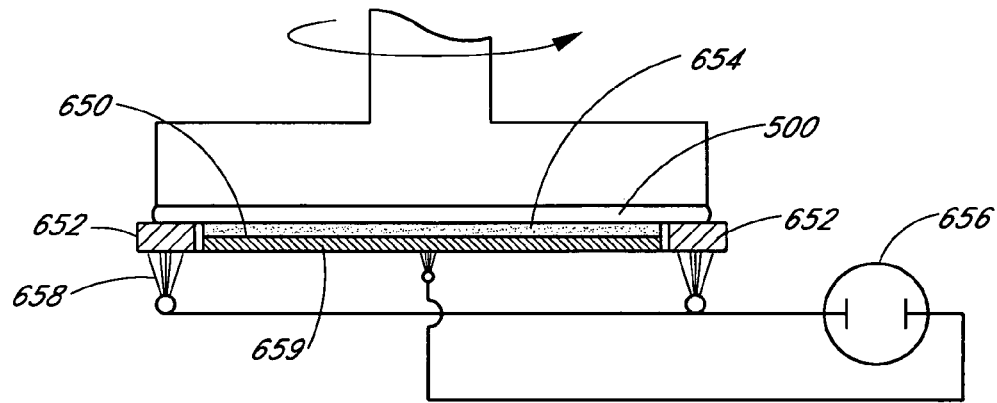
Figure 14C:
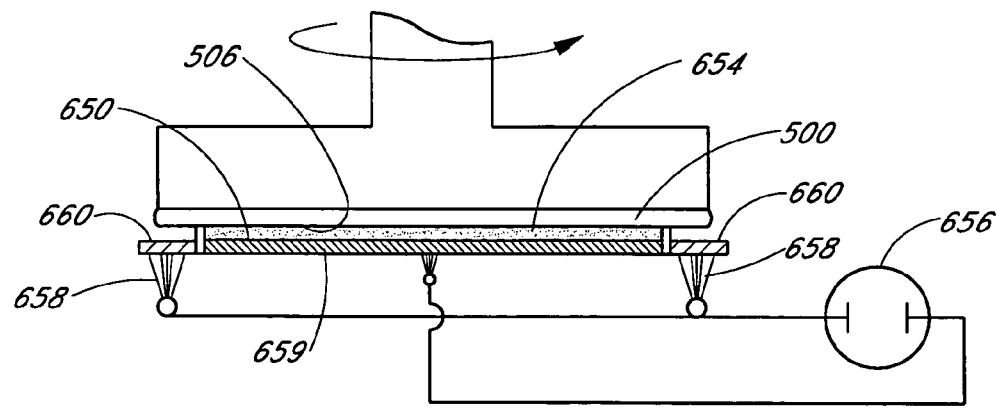

In the above embodiments, surface contacts are generally secured on a system component next to a belt pad. The surface contacts illustrated in the following embodiment overcome this limitation and are advantageously disposed in proximity of the polishing layer of the belt pad. As illustrated in FIG. 13, another embodiment of an exemplary belt pad 650 may have double-side embedded surface contacts 652, or embedded surface contacts, extending along both long sides of the polishing layer 654. The embedded surface contacts 652 may be made of thin flexible conductive strips attached along both sides of the belt pad 650, which are electrically isolated from the electrode of the belt pad. As illustrated in FIG. 14A, in a side view, when the surface of the wafer 500 is brought in proximity of the polishing surface 655 of the polishing layer 654, the edge of the wafer 500 is partially located on the embedded surface contacts 652. As the surface is placed on the polishing layer 654, as shown in FIG. 14B, the electrical connection between the embedded surface contacts 652 and a power supply 656 is established. The polishing electrode 659 is also connected to the power supply 656. In FIGS. 14A-14C, openings in the polishing layer 654 are omitted to simplify the figures.

Contact members 658, such as conductive brushes, may be used to connect the surface contacts 652 to the power supply 656. Brushes 658 establish a physical and electrical connection between the embedded surface contacts 652 and the terminal power supply 656 during the electropolishing process. Alternatively, as exemplified in FIG. 13, electricity may be coupled to the embedded surface contacts 652 from the top using electrical contacts 662, such as fingers, rollers, brushes, pins and the like.

Referring back to FIG. 14A, with this surface contact configuration, when the surface 506 of the wafer 500 is placed a predetermined distance away from the top surface of the polishing layer 654 of the belt pad, electrical connection between the edge of the surface of the wafer 500 and the embedded contacts 652 may be established through the process solution in between them. In this case, electrical connection between the embedded contacts 652 and the surface of the wafer 500 occurs without physically contacting the embedded surface contacts 652 and the surface of the wafer 500.

FIG. 14C shows another example of embedded surface contacts 660 that may be placed below the level of the top surface of the polishing layer 654 to establish electrical connection with the wafer surface through the process solution. In this embodiment, as the surface of the wafer 500 is polished by the polishing area, electrical connection to the conductive surface of the wafer 500 is provided through the process solution, which forms a meniscus between the embedded surface contacts 660 and the edge of the surface 506. In the embodiments described with reference to FIGS. 13-15, the belt pad may include openings, preferably with varying sizes optimized for uniform removal. Keeping the principles described in FIG. 12 in mind, larger openings may be placed along the path of the edge of the surface 506 of the wafer 500 to compensate for material removal differences between the edge and center regions of the surface of the wafer 500 caused by reduced time exposure of the wafer edge to the polishing layer 654. Alternatively, larger openings may be positioned at the center regions of the wafer to obtain a center-fast removal profile.

Figure 15:
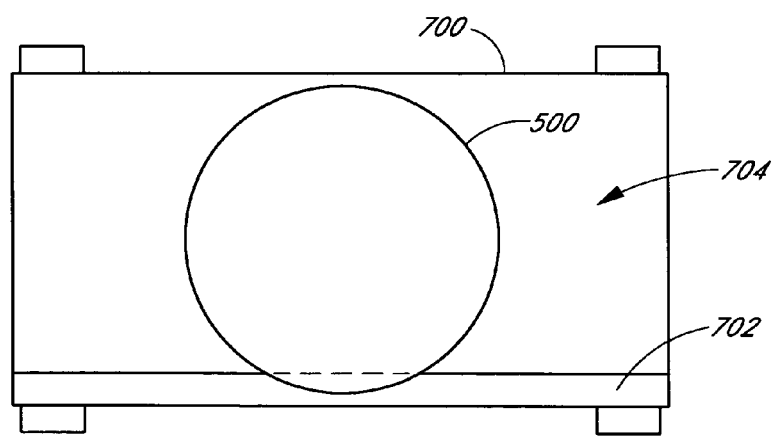
FIG. 15 a schematic plan view of a belt electropolishing pad with an embedded surface contact, which is configured as a conductive strip placed in the electropolishing pad.

FIG. 15 illustrates a belt pad 700 having a single side embedded surface contact 702 located at one side of a polishing surface 704. In this embodiment, the embedded surface contact 702 functions the way embedded surface contacts 652 described above functions, but the contact is at one side of the polishing pad 700. Alternatively, the approach described in FIG. 14C can be applied to the one side contact, and it is placed below the level of the top surface of the polishing layer 704 or polishing surface for electrical connection through the solution. During the process, by moving or scanning the wafer laterally in the y-direction, while still keeping at least a portion of the edge of the surface of the wafer 500 on the embedded surface contact 702 for electrical connection, the material removal from the edge region may be increased.

Figure 16:
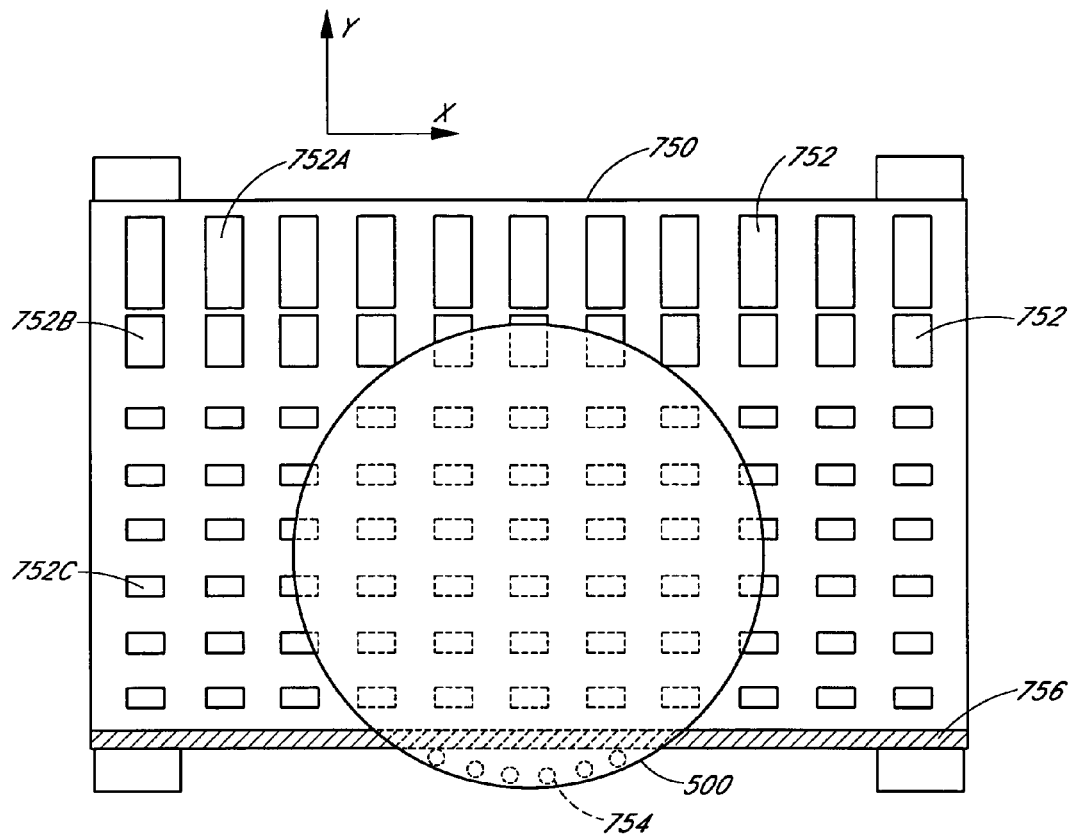
FIG. 16 is a schematic plan view of another embodiment of the electropolishing pad including both an embedded and a side surface contact.

FIG. 16 is a hybrid structure of the embodiments described in connection to FIGS. 12 and 15. In this embodiment, the belt pad 750 comprises openings 752, such as 752A, 752B and 752C. Electrical connection to the surface of the wafer 500 maybe established using single side surface contacts 754 and a single side embedded surface contact 756. During the process, the surface contacts 754 and embedded surface contacts 756 can be used together or separately, depending on the motion of the wafer 500. For example, if the wafer 500 is moved in the y-direction to expose the edge of the surface of the wafer 500 to the large openings 752A, only the embedded surface contact 756 can be used to establish electrical connection to the wafer surface. As described above with respect to the previous embodiment, moving or scanning the wafer in the y-direction, while still keeping at least a portion of the edge of the surface of the wafer 500 on the embedded surface contact 756 for electrical connection, the material removal from the edge region is further increased.

Figure 17A:
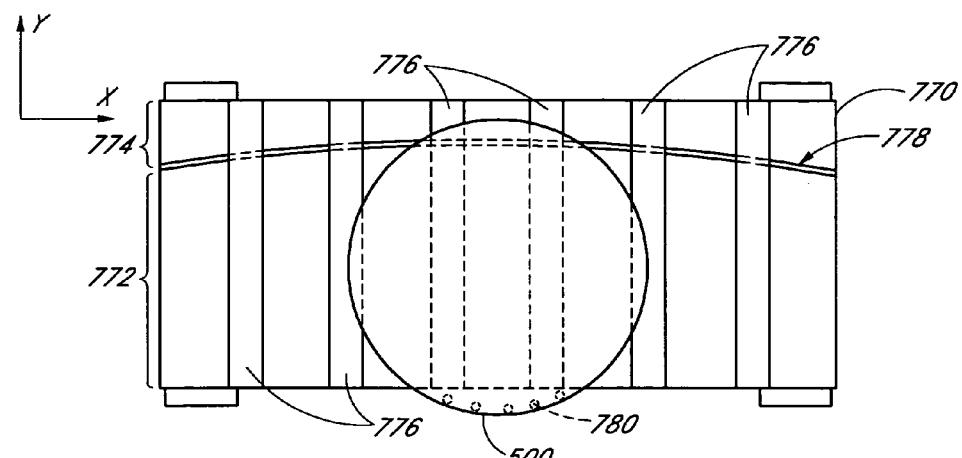
FIGS. 17A-17C are schematic plan view of three embodiments of electropolishers, each including laterally adjacent electrodes extending along the direction of linear motion of the electropolisher.

In another embodiment of the present invention, the material removal difference between the edge and the center regions in a wafer may be eliminated, reduced or controlled by employing an electropolisher with multiple electrodes. As shown in FIG. 17A, an electropolisher 770 or belt pad may include a first electrode 772 and a second electrode 774 and a polishing layer 776 placed on the electrodes 772 and 774. A divider 778 separates and electrically isolates the first electrode 772 from the second electrode 774. During the process, a first potential is applied to the first electrode 774 and a different second potential is applied to the second electrode 772. In this embodiment, although both electrodes 772, 774 are electropolishing electrodes, they functionally differ from one another. Generally, the majority of the surface of the wafer 500 is exposed to the first electrode 772, and only an annular region along the edge of the wafer surface is exposed to the second electrode 774. The second electrode 774 is utilized to eliminate any non-uniformity, which is caused by the single side surface contact method, between the edge region and the rest of the wafer surface (central region). Electrical contact to the surface of the wafer 500 is made using single side contacts 780 placed outside the electropolisher 770 (see also FIGS. 11A-11B). Accordingly, as the wafer 500 is rotated, an annular area along the edge of the wafer surface touch the contacts 780. Since this edge area of the wafer surface intermittently leaves the polisher 770 and the electropolishing conditions, the effect of electropolishing in this region is less than the rest of the wafer surface and therefore less electropolishing occurs at the edge region of the wafer surface. The polishing rate difference between the edge and the center regions can be minimized by keeping the second voltage or electropolishing current density higher than the first voltage or electropolishing current density to remove more material with the second electrode 774. As seen in FIG. 17A, the second electrode 774 generally controls the removal from the edge region of the surface of the wafer 500 while the first electrode 772 controls the removal from the center region of the wafer surface. In other words, when the wafer 500 is placed on the polisher 770, an annular region along the edge of the surface of the rotating wafer 500 is exposed to or over the second electrode 774 while an annular region about the center of the surface is exposed to or over the first electrode 772.

In order to reduce the effects of the divider 778 on the surface of the wafer 500, the divider 778 is preferably configured as a curved line (or a line that is not parallel to x direction) to eliminate any under-polished regions on the surface of the wafer 500. If the divider 778 was parallel to the x-direction and if the belt and/or wafer was moved in x-direction, there would be a ring of low removal area on the wafer 500, the width of the ring being approximately equal to the width of the divider 778. With the design of FIG. 17A, as the rotating wafer 500 or the electropolisher 770 is moved linearly in the longitudinal or x-direction, the portion of the surface that is exposed to the divider 778 is effectively moved laterally in the y-direction. The longitudinal relative motion of the wafer 500 thus causes the electropolishing "dead zone" of the divider 778 to move laterally relative to the wafer 500 since the divider is not parallel to x direction. Therefore, the border between the edge region and the central region of the wafer 500, i.e., the "dead zone" defined by the divider is continuously exposed to the first electrode 772 and the second electrode 774 to avoid any under-polished region on the surface of the wafer 500. However, if the divider 778 were made straight and parallel to the x-direction, with the linear motion of the electropolisher 770 or the lateral motion of the wafer 500 in the x-direction, a line of under-etched region would be formed on surface of the wafer 500, where the material removal rate is slower than the rest. The under-etched region corresponds to the divider 778 because very little material removal occurs on the wafer surface along the divider 778, if the divider 778 is formed as a straight line that is parallel to the x-direction. However, a curved or a wavy divider, such as the one in the illustrated embodiment, prevents the formation of such a region by continuously exposing such a critical border region over the first and second electrodes 772, 774. An angled straight shape or v-shaped (zig-zag) border may also be used to achieve a similar effect. The electrodes 772 and 774 continuously extend longitudinally along the x-direction on the electropolisher 770 laterally adjacent to one another. In one embodiment, the first electrode 772 extends along a first side of the electropolisher and is next to the surface contacts. The second electrode 774 extends along the opposing side of the electropolisher. Both sides are preferably parallel to the x-direction.

It should be noted that although only two electrodes are shown in FIG. 17A, more electrodes (e.g., three, four, five, etc. electrodes) may be used in the design. In this case, isolation regions that are non-parallel to the x-direction are positioned between each electrode and each electrode may be connected to a different power supply to control removal rate from a specific region on the wafer surface. Alternatively, a single power supply may be switched between the various electrodes during the process. Preferably, since the electrical contact to the wafer 500 is made near the edge through side contacts 780, material removal from the wafer surface is carried out from the central region first and then towards the edge region of the wafer 500. Accordingly, first the electrode across from the wafer center is activated and then power is connected to the electrodes facing the outer regions of the wafer 500. Alternatively, power may be applied to all electrodes at the same time. However, current densities flowing through the various electrodes to the wafer surface may be adjusted to obtain the desired removal profiles since higher current densities correspond to higher removal rates. Automatic removal profile control may be achieved through software that applies pre-determined current density values to the various electrodes. This may be tied to the thickness profile of the conductor on the wafer surface. For example, if the thickness profile of the conductor to be removed from the surface of the incoming wafer is edge-thick, then the software may automatically apply higher current densities to the electrode or electrodes affecting the edge region of the wafer to make up for the incoming thickness non-uniformity and to provide a uniform result after the electropolishing step is finished.

Figure 17B:
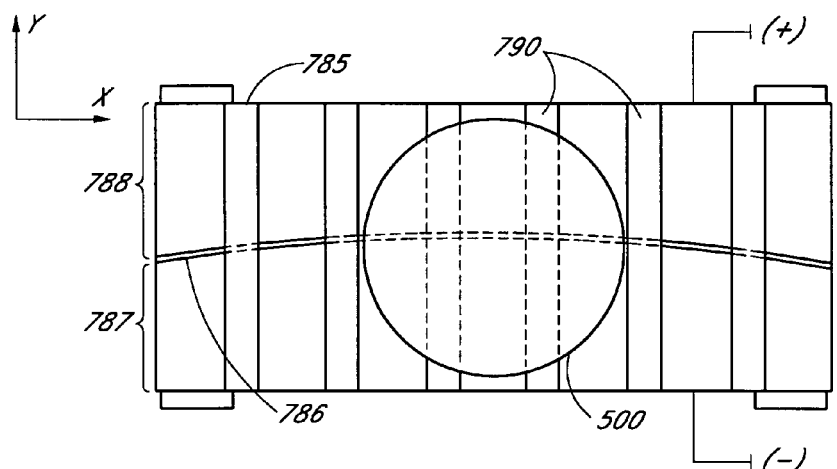

As illustrated in FIG. 17B, with an electropolisher 785, a similar design can be used to eliminate single side contacts shown in FIG. 17A. In this embodiment, a divider 786 separates a first electrode 787, which is cathodically polarized, from a second electrode 788, which is anodically polarized. As shown in FIG. 17B, as a surface of the wafer 500 is placed over the electropolisher 785, generally, an edge region of the wafer surface is exposed to the second electrode 788 and the central region of the wafer surface is exposed to the first electrode 787. However, as can be seen, in this embodiment, as the wafer 500 is rotated, a large edge region undergoes a reduced rate of electropolishing in comparison to a fully electropolished but smaller central region. As the wafer or the electropolisher is linearly moved along the x-direction, the central region is fully or partially exposed to the second electrode 788 by crossing the isolation region 786. This, in turn, provides uniform electropolishing across the surface of the wafer 500 and minimized non-uniform material removal. The electrodes 787 and 788 continuously extend longitudinally along the opposing sides of the electropolisher 785 and along the x-direction, laterally adjacent to one another. A polishing layer 790 or polishing pad is placed on the electrodes 787 and 788 to polish the surface of the wafer 500 during electropolishing. In this embodiment, in presence of an electropolishing solution, material removal from the surface of the wafer 500 occurs as the surface is moved over and exposed to the first electrode 787. The second electrode 788 acts like a non-touching contact and anodically polarizes the surface of the wafer 500 through the electropolishing solution, as the wafer 500 is rotated and moved over the electrodes 787, 788. In an embodiment, as the conductive surface of the wafer 500 is rotated and moved over the electrodes 787, 788, preferably less than fifty percent (50%) of the conductive surface of the wafer 500 is exposed to the second electrode 788 so that removal first occurs from the central region of the wafer 500. It will be understood that, after the central portion is substantially electropolished, the polarity of voltage on the first and second electrodes 787,788 may be reversed to electropolish the edge region at a faster rate. The electrodes 787 and 788 continuously extend along the x-direction on the electropolisher 785. In one embodiment, the first electrode 787 extends along a first side of the electropolisher 785. The second electrode 788 extends along the opposing side of the electropolisher 785. Both sides of the electropolisher 785 are preferably parallel to the x-direction.

Figure 17C:
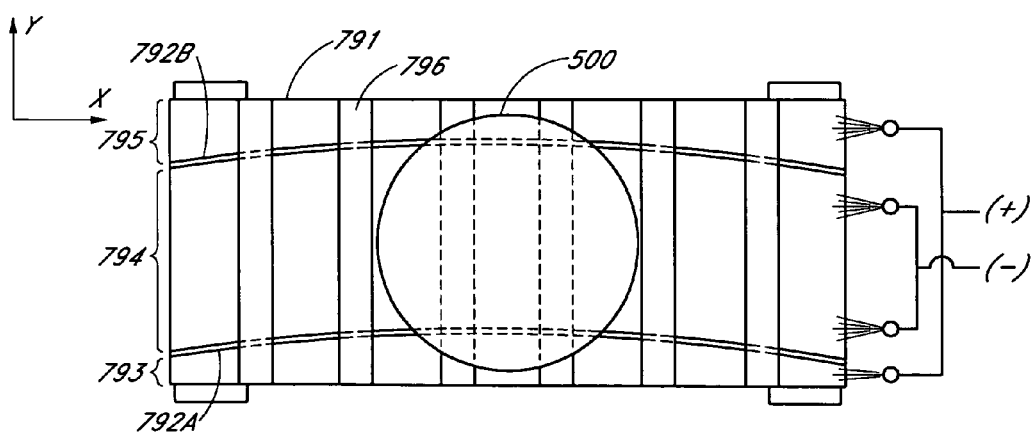

As illustrated in FIG. 17C, an electropolisher 791 with a multiple electrode design can also be used to eliminate single side contacts shown in FIG. 17A. In this embodiment, dividers 792A-792B separate a first electrode 793 and a third electrode 795 (which may be anodically polarized) from a second electrode 794 (which may be cathodically polarized). A polishing layer 796 or polishing pad is placed on the electrodes 793-795 to polish the surface of the wafer 500 during electropolishing process. In this embodiment, with an electropolishing solution, material removal from the surface of the wafer 500 occurs as the surface is moved over the polishing layer. As the rotating wafer 500 is moved linearly in the longitudinal or x-direction, the central region is mostly exposed to electrode 794 and partially exposed to electrodes 793 and 795. The curved (or otherwise non-linear) dividers 792A, 792B enhance electropolishing uniformity on the wafer surface as described earlier. The first and third electrodes 793 and 795 act like non-touching contacts and anodically polarize the surface of the wafer 500 through the electropolishing solution, as the wafer 500 is rotated and moved over the electrodes. This way conductive material is first removed from the central area of the wafer where exposure to electrode 794 is large and continuous. Then the edge regions get removed as they travel over the electrode 794 intermittently as the wafer rotates. This is preferable because if the material is removed first from the area where anodic contact is made to the wafer, i.e., the edge region, then it would not be practical to conduct appreciable removal current to the central region of the wafer to be able to remove the material there at fast rate. It should be noted that after removing material from the central region of the wafer the voltage polarities may be reversed, i.e., electrode 794 may be made anodic and at least one of the electrodes 795 and 793 may be made cathodic, to further accelerate and better control the material removal from the edge region. The principles of the embodiments described above in connection with FIGS. 17A-17C can also be applied to electropolishers that are fixed on a support plate or kept on a plate using various means, such as vacuum suction. Such alternative electropolishers can be moved by moving their support plates.

Figure 18A:
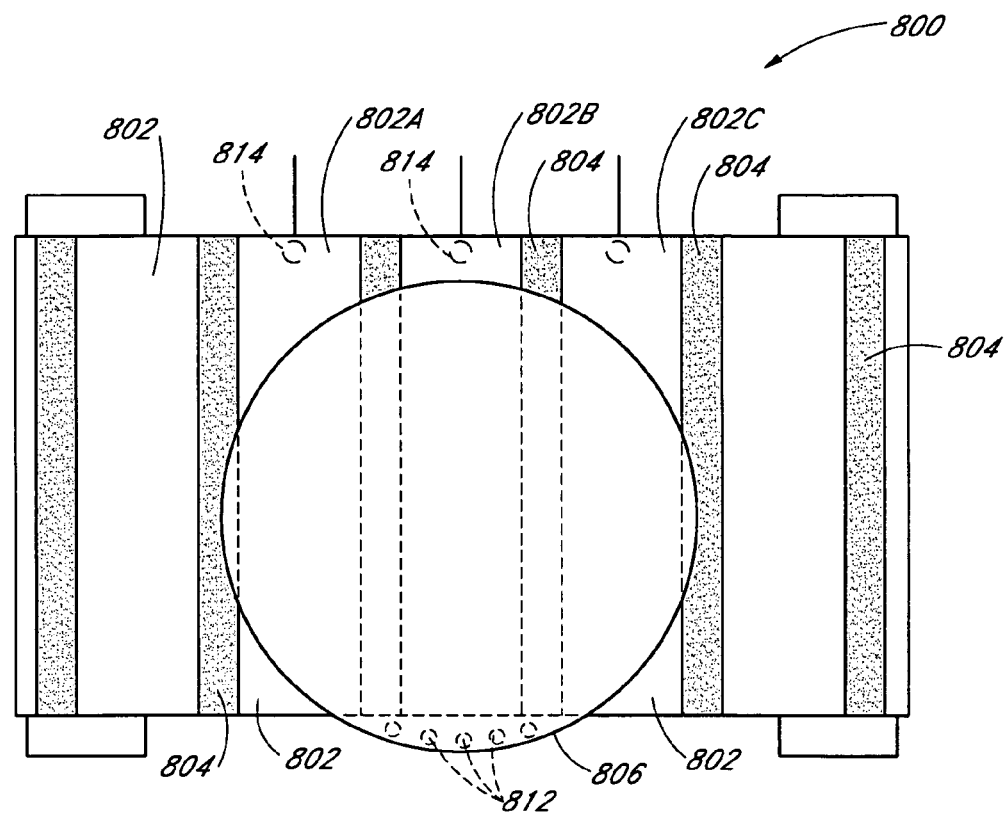
FIGS. 18A-18B are schematic plan and side views of an electropolisher including electrodes extending laterally, substantially perpendicular to the direction of linear motion of the electropolisher.
Figure 18B:
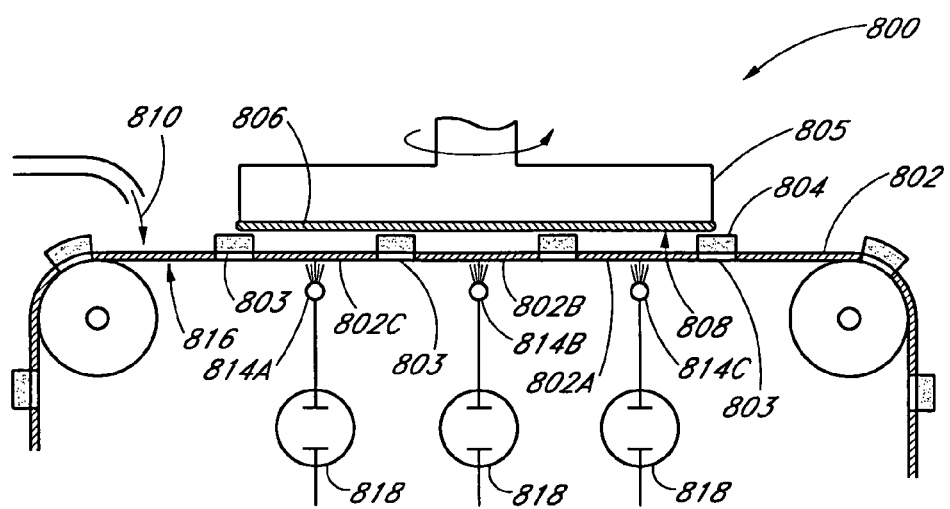

One lateral side of the belt electropolisher may be utilized for establishing electrical connection to the wafer surface while the other side of the electropolisher is utilized for establishing electrical connection to the electrode of the belt pad. One or more side electrode contacts may be used to connect the electrode to a power supply. As will be described below, use of side electrode contacts especially facilitates the use of multiple electrodes. FIGS. 18A-18B illustrate an electropolishing system 800 having a belt electropolisher, such as a belt pad, including electrodes 802 separated by parts of a polishing layer 804. The belt pad may be moved linearly or bi-linearly and may be placed on a showerhead, as described in connection with the previous embodiments. The belt pad may be constructed similarly to the belt pad 300 of FIG. 5. As shown in FIG. 18B, the system 800 may also include a wafer carrier 805 to hold a wafer 806 to electropolish surface 808 of the wafer 806 using an electropolishing solution 810. Electrical connection to the surface of the wafer 806 is made through single side surface contacts 812, as described in the above embodiments.

Referring back to FIGS. 18A-18B, in this embodiment, each electrode 802 is shaped as a rectangular plate. The electrodes 802 are connected to a power supply or multiple power supplies 818 through side electrode contacts 814. The side electrode contacts are located along one side of the belt pad and touch the electrodes through an exposed portion of the electrode which is not electrically isolated, such as an exposed end portion or edge of a bottom surface 816. The belt pad may be designed such that it is possible to apply different electropolishing voltages to each electrode 802 using different power supplies or a single power supply, which is capable of applying more than one voltage. During an electropolishing process by applying different voltages to electrodes 802A, 802B and 802C, material removal rates from corresponding surface locations can be controlled to obtain uniform or non-uniform removal profiles. For example, by applying a higher voltage to the electrode 802B while applying a lower voltage to the electrodes 802A and 802C produces a low removal rate from the edge region on the surface of the rotating wafer. Similarly, other profiles or a uniform thickness profile can be produced by controlling the electrode voltages or currents while establishing a relative motion between the surface of the wafer and the belt pad. As can be appreciated from FIG. 18B, as the belt pad is moved to the right or left, the side electrode contacts 814A stay stationary and as one electrode moves away and loses physical contact with a specific side electrode contact, another one moves in position to establish physical contact. This way, as far as the rotating wafer is concerned, during polishing there are always electrode strips that are electrically active right across its surface, and these electrodes are substantially either across from wafers central region or its edge region.

Figure 19:
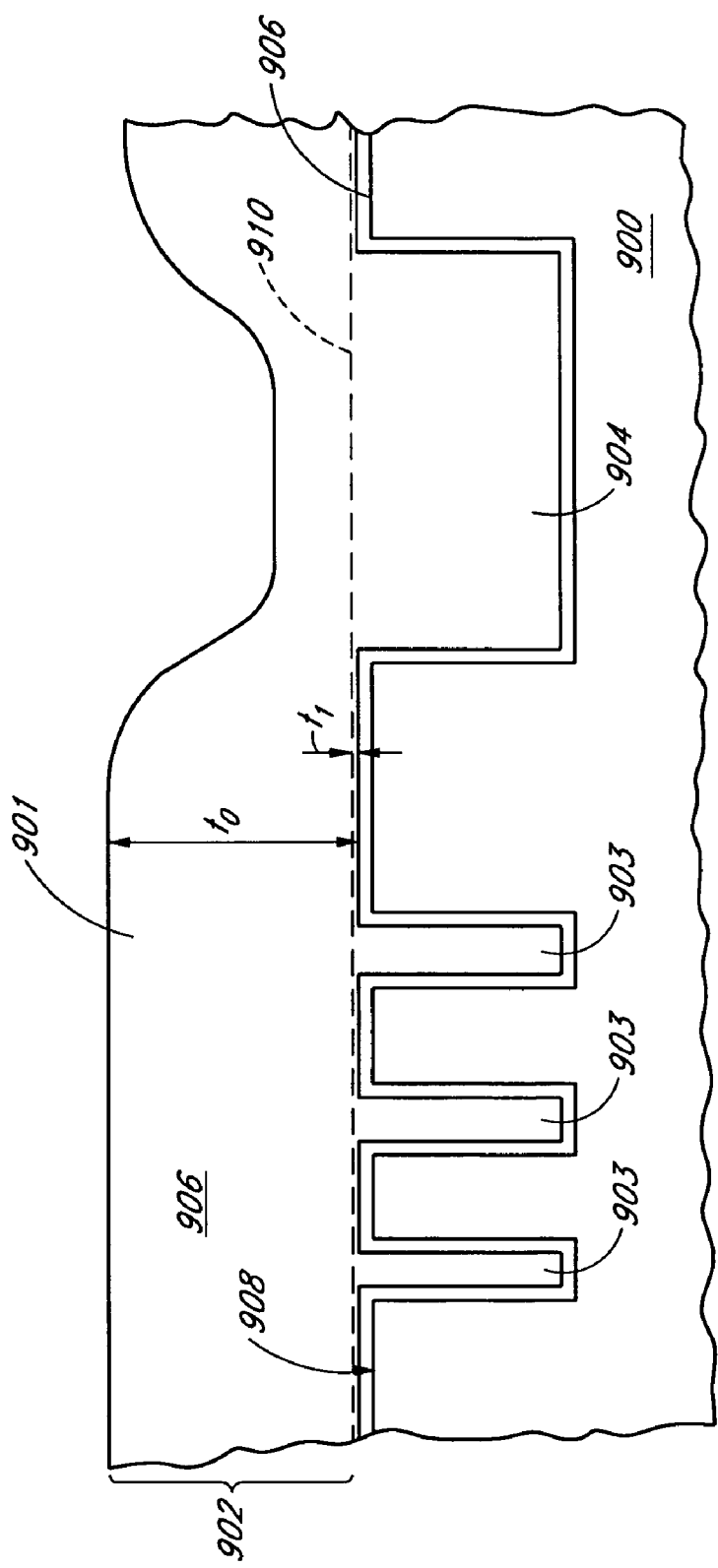
FIG. 19 is a substrate processed with the electropolishing system of an embodiment.

The above described embodiments provide a material removal process comprising electrochemical mechanical polishing and chemical mechanical polishing, both of which can be performed in the same electrochemical mechanical processing module. This two-step process can be applied to the structure shown in FIG. 19. FIG. 19 shows a substrate 900 having a copper layer 901. An overburden 902 of the copper layer 901 is removed using the process of this embodiment. The overburden 902 may be a non-uniform layer, as shown in FIG. 19, or a planar layer, which is not relevant to the process of this embodiment. The substrate comprises features 903 and 904 formed in it. The substrate 900 may be a dielectric layer formed on a semiconductor wafer. The features 903 are high aspect ratio cavities, such as vias, and form a so-called high-density array. A high-density array is generally comprised of features, preferably high aspect ones, located densely on certain areas of wafers. The feature 904 is a low aspect ratio large feature, such as a trench. Inside the features 903 and 904 and surface 906 of the substrate 900 may be coated with a barrier layer 908. Copper layer 901 is formed on the barrier layer 908, filling the features 903, 904.

Referring to FIG. 19, in one embodiment, electrochemical mechanical polishing reduces the thickness of the copper layer down to approximately 1000 Angstroms (Å). The electrochemical mechanical polishing is performed by applying the belt pad described above while a potential difference is applied between the copper layer and an electrode ECMPR module. During the process, relative motion is established between the polishing pad layer and copper layer 901 of the belt pad while a process solution, such as an electropolishing solution, is applied to the pad. At a first stage of the process, an electrochemical mechanical polishing (ECMP) process is applied at a high removal rate, such as a rate more than 4000 Å/minute, to planarize and reduce the thickness of the overburden 902 to an approximately 1000 Å, as depicted with line 910. In other words, the thickness $t_0$ of the overburden is reduced to $t_1$, which is approximately equal to 1000 Å. At this point, the applied potential between the copper layer and the electrode is interrupted and the material removal is continued in a chemical mechanical polishing (CMP) process mode by having a relative motion between the remaining copper surface and the polishing pad layer in the same module and using the same electropolishing solution. The CMP process is applied at a lower material removal rate, such as a rate at a range between 2000 to 4000 Å/minute. The CMP process continues until the copper is cleared from top of the high-density regions having features 903 without dishing the copper in large feature 904. Alternatively, at this step, a CMP solution may be used to fine-polish the copper.

Although various preferred embodiments and the best mode have been described in detail above, those skilled in the art will readily appreciate that many modifications of the exemplary embodiment are possible without materially departing from the novel teachings and advantages of this invention.

We claim:

1. A method of electropolishing a conductive surface on a wafer, comprising:

positioning the conductive surface in proximity to a polisher having at least one cathode surface and at least one anode surface;

rotating the wafer;

linearly moving the conductive surface parallel to a first direction and over both at the at least one anode surface and the at least one cathode surface so as to vary an exposure of relative surface areas of the conductive surface to the at least one cathode surface and the at least one anode surface;

electropolishing the conductive surface, wherein as the conductive surface is moved, less than 50% of the conductive surface is exposed to the at least one anode surface, wherein as the conductive surface is moved, an edge portion of the conductive surface is exposed to the at least one anode surface, wherein electropolishing of the conductive surface occurs at a faster rate at a central portion of the conductive surface than at the edge portion; and reversing a polarity of voltage on the at least one cathode surface and the at least one anode surface after the central portion is electropolished.

2. The method of claim 1, wherein a pad material is positioned over the at least one cathode surface and the at least one anode surface.

3. The method of claim 2, further comprising polishing the conductive surface with the pad material as the conductive surface moves relative to the pad material.

4. The method of claim 1, further comprising delivering an electropolishing solution to the polisher.

5. The method of claim 1, wherein the at least one cathode surface and the at least one anode surface are separated by an isolation region that is not parallel to the first direction.

6. The method of claim 5, wherein while the conductive surface moves parallel to the first direction, portions of the conductive surface are moved along the isolation region such that exposures of relative surface areas of the conductive surface to the at least one cathode surface and the at least one anode surface are varied in a second direction, wherein the second direction is substantially orthogonal to the first direction.

7. The method of claim 1, wherein the step of linearly moving comprises at least one of bi-linear motion and uni-linear motion.

8. The method of planarization and electrochemical removal of conductive material from a conductive surface of a wafer, the method comprising:

positioning the conductive surface on a polisher having a first electrode and a second electrode, wherein the first electrode extends along a first side of the polisher and the second electrode extends along a second side of the polisher;

contacting an edge surface region of the conductive surface at the first side of the polisher to provide electrical connection;

rotating the wafer;

linearly moving the conductive surface parallel to a first direction and over both the first electrode and the second electrode so as to vary an exposure of relative surface areas of the conductive surface to the first electrode and the second electrode, wherein the first electrode and the second electrode extend longitudinally in the first direction and are laterally adjacent one another; and electropolishing the conductive surface.

9. The method of claim 8, wherein a pad material is placed top of the first electrode and the second electrode.

10. The method of claim 9, further comprising polishing the conductive surface with the pad material while the conductive surface is moving.

11. The method of claim 8, further comprising delivering an electropolishing solution to the polisher.

12. The method of claim 8, wherein the first electrode and the second electrode are separated by an isolation region that is non-parallel to the first direction.

13. The method of claim 12, wherein the first electrode and the second electrode are separated by a curved isolation region.

14. The method of claim 8, further comprising applying a negative potential to the first electrode and the second electrode.

15. The method of claim 14, wherein the negative potential applied to the first electrode is different from the negative potential applied to the second electrode.

16. The method of claim 14, wherein the negative potentials are applied at the same time.

17. The method of claim 14, wherein the negative potentials are applied at different times.

18. The method of claim 8, wherein linearly moving comprises at least one of bi-linear motion and uni-linear motion.

19. The method of claim 8, wherein the polisher has at least one other electrode extending between the first electrode and the second electrode.

* * * * *

UNITED STATES PATENT AND TRADEMARK OFFICE
CERTIFICATE OF CORRECTION

PATENT NO. : 7,648,622 B2 Page 1 of 1
APPLICATION NO. : 11/173233
DATED : January 19, 2010
INVENTOR(S) : Basol et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1236 days.

Signed and Sealed this

Twenty-eighth Day of December, 2010

David J. Kappos
*Director of the United States Patent and Trademark Office*